US012701039B2

(12) United States Patent
Zhong et al.

(10) Patent No.: US 12,701,039 B2
(45) Date of Patent: Aug. 4, 2026

(54) METHOD FOR DETERMINING TRANSMISSION SLOT AND RELATED APPARATUS

(71) Applicant: Huawei Technologies Co., Ltd., Shenzhen (CN)

(72) Inventors: Qiwen Zhong, Shenzhen (CN); Yinlong Sun, Shenzhen (CN); Li Xu, Shenzhen (CN); Rixin Li, Dongguan (CN); Yongzhi Liu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 18/460,040

(22) Filed: Sep. 1, 2023

(65) Prior Publication Data

US 2023/0412446 A1 Dec. 21, 2023

Related U.S. Application Data

(63) Continuation of application No. PCT/CN2022/074398, filed on Jan. 27, 2022.

(30) Foreign Application Priority Data

Mar. 5, 2021 (CN) .......................... 202110245798.6

(51) Int. Cl.
*H04L 27/26* (2006.01)

(52) U.S. Cl.
CPC ...... *H04L 27/2659* (2013.01); *H04L 27/2634* (2013.01)

(58) Field of Classification Search
CPC . H04L 27/26; H04L 27/2601; H04L 27/2647; H04L 27/2655; H04L 27/2657; H04L 27/2659; H04L 27/2626; H04L 27/2627; H04L 27/2634; H04L 43/08; H04L 43/0852; H04L 43/0858; H04L 43/0864; H04L 43/087; H04L 12/28; H04L 12/40; H04L 12/40143; H04L 12/40156; H04L 12/40169
See application file for complete search history.

(56) References Cited

U.S. PATENT DOCUMENTS

| | | | | |
|---|---|---|---|---|
| 7,352,690 B2 * | 4/2008 | Geile | ................. | H04N 21/2402 370/344 |
| 7,467,056 B2 * | 12/2008 | Maniloff | ............ | H03K 19/1731 713/401 |
| 7,773,537 B2 * | 8/2010 | Geile | .................... | H04L 5/0044 370/480 |

(Continued)

FOREIGN PATENT DOCUMENTS

EP 3609115 A1 2/2020

OTHER PUBLICATIONS

"IEEE Standard for Ethernet," IEE Std 802.3, Jun. 14, 2018, 5600 pages.

(Continued)

*Primary Examiner* — James M Perez
(74) *Attorney, Agent, or Firm* — Conley Rose, P.C.

(57) ABSTRACT
A method for determining a transmission slot includes determining, by a target device, a sending slot based on a receiving slot and a latency correction parameter, or determining, by the target device, a receiving slot based on a sending slot and a latency correction parameter.

20 Claims, 16 Drawing Sheets

(56)                    References Cited

U.S. PATENT DOCUMENTS

| | | | | | |
|---|---|---|---|---|---|
| 8,014,374 | B2 * | 9/2011 | Li | H04L 27/2655 | |
| | | | | 370/349 | |
| 8,027,258 | B2 * | 9/2011 | Mizutani | H04L 47/826 | |
| | | | | 370/252 | |
| 8,161,210 | B1 * | 4/2012 | Norrie | H04L 25/14 | |
| | | | | 710/33 | |
| 9,549,383 | B2 * | 1/2017 | Ma | H04W 56/00 | |
| 9,622,019 | B2 * | 4/2017 | Li | H04W 4/70 | |
| 9,942,027 | B2 * | 4/2018 | Regev | H04J 3/0682 | |
| 10,231,163 | B2 * | 3/2019 | Chen | H04B 7/2615 | |
| 10,250,457 | B2 * | 4/2019 | Li | H04W 4/70 | |
| 10,555,150 | B2 * | 2/2020 | Li | H04L 43/08 | |
| 10,637,747 | B2 * | 4/2020 | Li | H04L 41/5016 | |
| 10,736,129 | B2 * | 8/2020 | Park | H04L 1/1812 | |
| 10,820,253 | B2 * | 10/2020 | Chen | H04W 28/26 | |
| 11,316,545 | B2 * | 4/2022 | Zhong | H04B 1/04 | |
| 11,363,629 | B2 * | 6/2022 | Zhuang | H04W 72/0446 | |
| 11,381,338 | B2 * | 7/2022 | Zhang | H04Q 11/00 | |
| 11,419,115 | B2 * | 8/2022 | Xue | H04W 72/23 | |
| 11,743,930 | B2 * | 8/2023 | Yang | H04W 72/04 | |
| | | | | 370/329 | |
| 11,991,744 | B2 * | 5/2024 | Zhuang | H04W 24/08 | |
| 12,278,768 | B2 * | 4/2025 | Zhong | H04L 47/827 | |
| 12,341,653 | B2 * | 6/2025 | Li | H04L 41/0893 | |
| 12,580,646 | B2 * | 3/2026 | Wang | H04B 10/03 | |
| 2001/0055311 | A1 * | 12/2001 | Trachewsky | H04L 1/0072 | |
| | | | | 370/445 | |
| 2006/0098605 | A1 * | 5/2006 | Li | H04L 27/2655 | |
| | | | | 370/338 | |
| 2007/0201352 | A1 * | 8/2007 | Geile | H04N 21/2221 | |
| | | | | 370/208 | |
| 2009/0080505 | A1 * | 3/2009 | Geile | H04W 24/08 | |
| | | | | 375/222 | |
| 2010/0002591 | A1 * | 1/2010 | Mizutani | H04Q 11/0062 | |
| | | | | 370/468 | |
| 2015/0237590 | A1 * | 8/2015 | Ma | H04L 7/0331 | |
| | | | | 370/350 | |
| 2016/0127094 | A1 * | 5/2016 | Jiang | H04L 5/0048 | |
| | | | | 370/252 | |
| 2016/0157043 | A1 * | 6/2016 | Li | H04W 4/70 | |
| | | | | 370/254 | |

| | | | | |
|---|---|---|---|---|
| 2017/0163540 | A1 * | 6/2017 | Li | H04L 45/38 |
| 2017/0366463 | A1 * | 12/2017 | Katar | H04L 47/2433 |
| 2018/0159746 | A1 * | 6/2018 | Li | H04L 41/5016 |
| 2018/0176853 | A1 * | 6/2018 | Chen | H04W 8/005 |
| 2018/0213459 | A1 * | 7/2018 | Chen | H04W 74/04 |
| 2019/0182126 | A1 * | 6/2019 | Li | H04L 43/0817 |
| 2019/0261337 | A1 * | 8/2019 | Park | H04L 5/0094 |
| 2020/0037245 | A1 * | 1/2020 | Lu | H04L 5/0094 |
| 2020/0059316 | A1 * | 2/2020 | Einhaus | H04L 5/0053 |
| 2020/0067827 | A1 * | 2/2020 | Mei | H04L 12/4641 |
| 2020/0196299 | A1 * | 6/2020 | Liu | H04W 52/0219 |
| 2020/0204312 | A1 * | 6/2020 | Xu | H04L 27/26025 |
| 2020/0322084 | A1 * | 10/2020 | Zhang | H04L 69/22 |
| 2020/0328767 | A1 * | 10/2020 | Zhong | H04B 1/04 |
| 2020/0389274 | A1 * | 12/2020 | Islam | H04L 5/0053 |
| 2021/0006386 | A1 * | 1/2021 | Qi | H04J 3/0676 |
| 2021/0359934 | A1 * | 11/2021 | Mei | H04J 3/1652 |
| 2022/0039153 | A1 * | 2/2022 | Zhuang | H04W 72/0446 |
| 2022/0217091 | A1 * | 7/2022 | Zhong | H04L 47/622 |
| 2022/0304049 | A1 * | 9/2022 | Zhuang | H04W 74/006 |
| 2022/0330253 | A1 * | 10/2022 | Yang | H04W 72/535 |
| 2022/0345261 | A1 * | 10/2022 | Ali | H04L 5/0048 |
| 2023/0035379 | A1 * | 2/2023 | Li | H04L 5/0044 |
| 2023/0056636 | A1 * | 2/2023 | Park | H04L 1/16 |
| 2023/0155756 | A1 * | 5/2023 | Qi | H04L 5/0044 |
| | | | | 370/458 |
| 2023/0412446 | A1 * | 12/2023 | Zhong | H04L 5/0094 |
| 2024/0223321 | A1 * | 7/2024 | Li | H04L 5/0053 |
| 2024/0284419 | A1 * | 8/2024 | Ouchi | H04W 72/0446 |
| 2024/0357638 | A1 * | 10/2024 | Zhuang | H04W 74/04 |
| 2025/0047581 | A1 * | 2/2025 | Qi | H04L 43/0852 |
| 2025/0047582 | A1 * | 2/2025 | Zhou | H04L 43/0852 |
| 2025/0048345 | A1 * | 2/2025 | Yang | H04W 4/40 |
| 2025/0062970 | A1 * | 2/2025 | Shi | H04W 4/70 |
| 2025/0184032 | A1 * | 6/2025 | Li | H04J 3/1658 |
| 2025/0184038 | A1 * | 6/2025 | Li | H04L 1/0061 |
| 2025/0209328 | A1 * | 6/2025 | Zhuang | G06N 10/40 |
| 2025/0232595 | A1 * | 7/2025 | Zhuang | G01S 7/4808 |

OTHER PUBLICATIONS

"IA Flex Ethernet 2.1 Implementation Agreement," IA OIF FLEXE-02.1, Jul. 2019, total 56 pages.

* cited by examiner

CONT. FROM

Fine granularity service 1
Fine granularity service 2

Receive end 122

Fine granularity channel 401

Code block sequence 411

Code block sequence 511

...

Code block sequence 611

Coarse granularity channel 40

Coarse granularity channel 50

Coarse granularity channel 60

Code block sequence 1211

| Input data | Synchronization header | 64-bit block payload | | | | | | | |
|---|---|---|---|---|---|---|---|---|---|
| Bit location / Data block format | 01 | 2 | | | | | | | 65 |
| $D_0D_1D_2D_3D_4D_5D_6D_7$ | 01 | $D_0$ | $D_1$ | $D_2$ | $D_3$ | $D_4$ | $D_5$ | $D_6$ | $D_7$ |
| Control block format | | Block type region | | | | | | | |
| $C_0C_1C_2C_3C_4C_5C_6C_7$ | 10 | 0x1E | $C_0$ | $C_1$ | $C_2$ | $C_3$ | $C_4$ | $C_5$ | $C_6$ | $C_7$ |
| $S_0D_1D_2D_3D_4D_5D_6D_7$ | 10 | 0x78 | $D_1$ | $D_2$ | $D_3$ | $D_4$ | $D_5$ | $D_6$ | $D_7$ |
| $O_0D_1D_2D_3Z_4Z_5Z_6Z_7$ | 10 | 0x4B | $D_1$ | $D_2$ | $D_3$ | $O_0$ | $C_4$ | $C_5$ | $C_6$ | $C_7$ |
| $T_0C_1C_2C_3C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3C_4C_5C_6C_7$ | 10 | 0xAA | $D_0$ | $D_1$ | | $C_3$ | $C_4$ | $C_5$ | $C_6$ | $C_7$ |
| $D_0D_1D_2T_3C_4C_5C_6C_7$ | 10 | 0xB4 | $D_0$ | $D_1$ | $D_2$ | | $C_4$ | $C_5$ | $C_6$ | $C_7$ |
| $D_0D_1D_2D_3T_4C_5C_6C_7$ | 10 | 0xCC | $D_0$ | $D_1$ | $D_2$ | $D_3$ | | $C_5$ | $C_6$ | $C_7$ |
| $D_0D_1D_2D_3D_4T_5C_6C_7$ | 10 | 0xD2 | $D_0$ | $D_1$ | $D_2$ | $D_3$ | $D_4$ | | $C_6$ | $C_7$ |
| $D_0D_1D_2D_3D_4D_5T_6C_7$ | 10 | 0xE1 | $D_0$ | $D_1$ | $D_2$ | $D_3$ | $D_4$ | $D_5$ | | $C_7$ |
| $D_0D_1D_2D_3D_4D_5D_6T_7$ | 10 | 0xFF | $D_0$ | $D_1$ | $D_2$ | $D_3$ | $D_4$ | $D_5$ | $D_6$ | |

FIG. 6

1023 repetitions

| Overheads (OH) | 0 | 1 | ... | 19 | 0 | 1 | ... | 19 | 0 | 1 | ... | 19 | 0 | 1 | ... | 19 |
|---|---|---|---|---|---|---|---|---|---|---|---|---|---|---|---|---|
| Overheads (OH) | 0 | 1 | ... | 19 | 0 | 1 | ... | 19 | 0 | 1 | ... | 19 | 0 | 1 | ... | 19 |
| Overheads (OH) | 0 | 1 | ... | 19 | 0 | 1 | ... | 19 | 0 | 1 | ... | 19 | 0 | 1 | ... | 19 |
| Overheads (OH) | 0 | 1 | ... | 19 | 0 | 1 | ... | 19 | 0 | 1 | ... | 19 | 0 | 1 | ... | 19 |
| Overheads (OH) | 0 | 1 | ... | 19 | 0 | 1 | ... | 19 | 0 | 1 | ... | 19 | 0 | 1 | ... | 19 |
| Overheads (OH) | 0 | 1 | ... | 19 | 0 | 1 | ... | 19 | 0 | 1 | ... | 19 | 0 | 1 | ... | 19 |
| Overheads (OH) | 0 | 1 | ... | 19 | 0 | 1 | ... | 19 | 0 | 1 | ... | 19 | 0 | 1 | ... | 19 |
| Overheads (OH) | 0 | 1 | ... | 19 | 0 | 1 | ... | 19 | 0 | 1 | ... | 19 | 0 | 1 | ... | 19 |

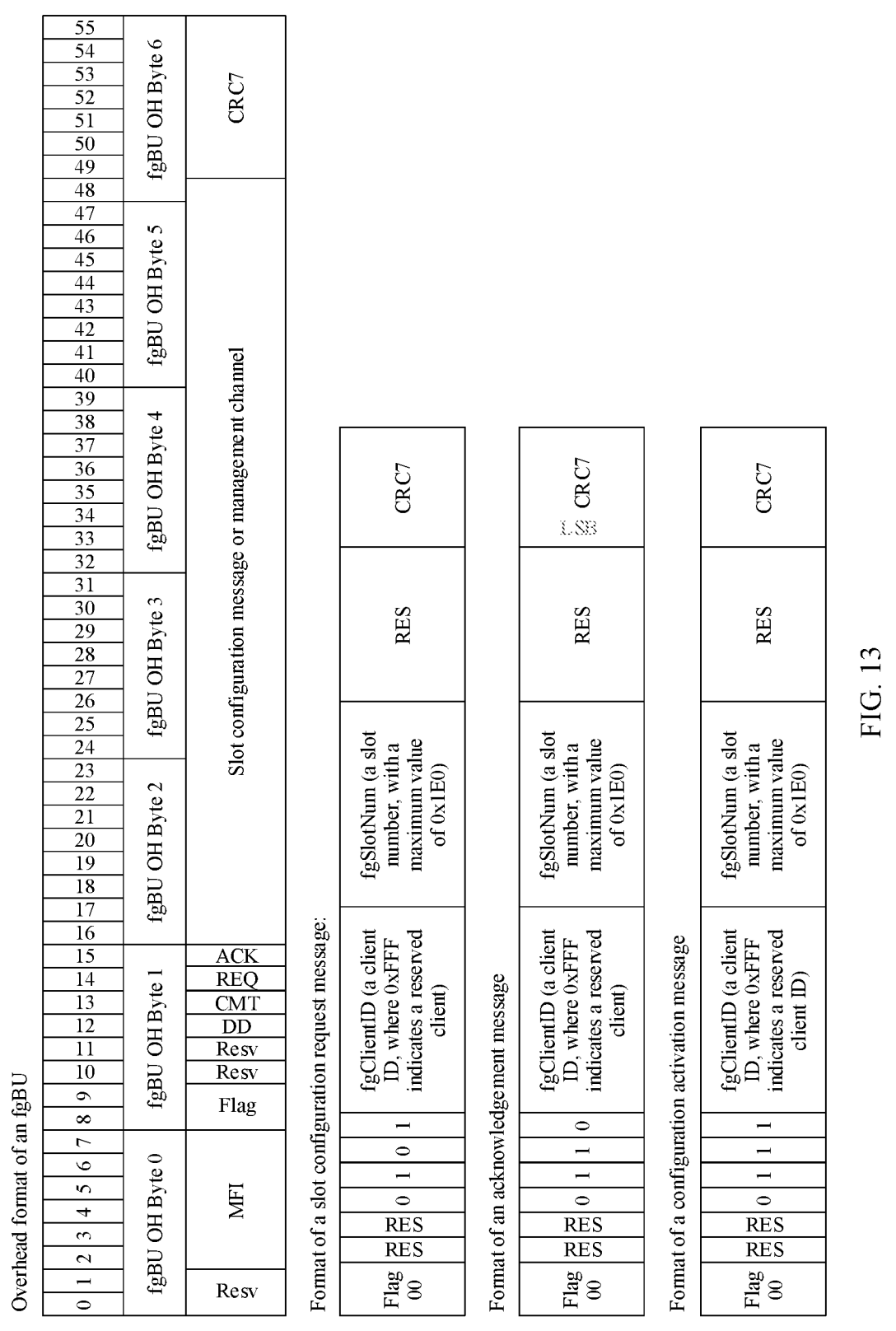

Overhead format of an fgBU

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|

| fgBU OH Byte 0 | fgBU OH Byte 1 | fgBU OH Byte 2 | fgBU OH Byte 3 | fgBU OH Byte 4 | fgBU OH Byte 5 | fgBU OH Byte 6 |
|---|---|---|---|---|---|---|
| MFI | ACK / REQ / CMT / DD / Resv / Resv / Flag | Slot configuration message or management channel | | | | CRC7 |
| Resv | | | | | | |

Format of a slot configuration request message:

| Flag 00 | fgClientID (a client ID, where 0xFFFF indicates a reserved client) | fgSlotNum (a slot number, with a maximum value of 0x1E0) | RES | CRC7 |
|---|---|---|---|---|
| RES | | | | |
| RES | | | | |

Format of an acknowledgement message

| Flag 00 | fgClientID (a client ID, where 0xFFFF indicates a reserved client) | fgSlotNum (a slot number, with a maximum value of 0x1E0) | RES | LSB CRC7 |
|---|---|---|---|---|
| RES | | | | |
| RES | | | | |

Format of a configuration activation message

| Flag 00 | fgClientID (a client ID, where 0xFFFF indicates a reserved client ID) | fgSlotNum (a slot number, with a maximum value of 0x1E0) | RES | CRC7 |
|---|---|---|---|---|
| RES | | | | |
| RES | | | | |

FIG. 13

| First communication device 101 | Network management apparatus 100 | Intermediate node 110 | Intermediate node 111 |
|---|---|---|---|

1501: A slot configuration request message

1502: Obtain a latency correction parameter of the intermediate node 110 and a latency correction parameter of the intermediate node 111

1503: Determine a second sending slot

1504: A slot configuration request message

1505: Determine a third sending slot

1506: A slot configuration request message

FIG. 15

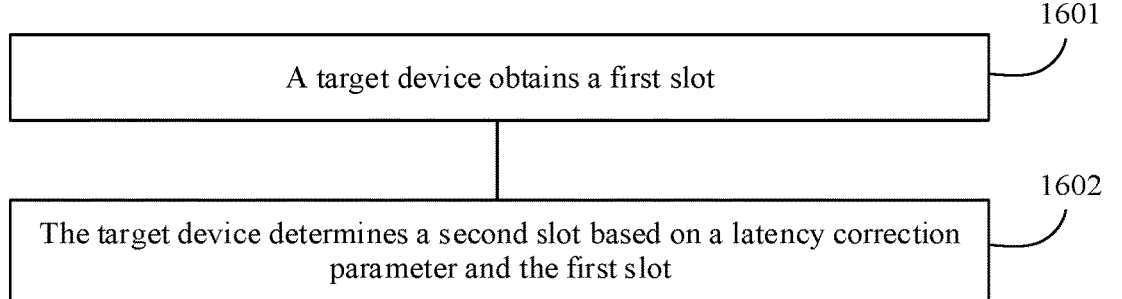

1601

A target device obtains a first slot

1602

The target device determines a second slot based on a latency correction parameter and the first slot

FIG. 16

METHOD FOR DETERMINING TRANSMISSION SLOT AND RELATED APPARATUS

CROSS-REFERENCE TO RELATED APPLICATIONS

This application is a continuation of International Patent Application No. PCT/CN2022/074398 filed on Jan. 27, 2022, which claims priority to Chinese Patent Application No. 202110245798.6 filed on Mar. 5, 2021. The disclosures of the aforementioned applications are hereby incorporated by reference in their entirety.

TECHNICAL FIELD

The present disclosure relates to the field of communication technologies, and more specifically, to a method for determining a transmission slot and a related apparatus.

BACKGROUND

Flexible Ethernet (FlexE) is a standard protocol defined by the Optical Internetworking Forum (OIF). A FlexE technology is a cost-effective, highly reliable, and dynamically configurable interface technology implemented based on a fast Ethernet interface through decoupling between an Ethernet media access control (MAC) layer and a physical layer (PHY).

The FlexE supports higher bandwidth through port bonding. For example, eight 100 gigabits per second (Gbps) ports are bonded to achieve a bandwidth of 800 Gbps. The FlexE implements flexible bandwidth allocation and supports access at diverse service rates through a channelization technology, without being limited by a tiered rate system defined in the Institute of Electrical and Electronics Engineers (IEEE) 802.3 standard. In addition, in the FlexE, a 100 Gbps interface is divided into 20 slots, and each slot is 5 Gbps. Therefore, the FlexE can support a service with a bandwidth of N×5 Gbps through slot allocation. Because bandwidth needs to be allocated based on a basic unit of 5 Gbps in the FlexE, a service with a non-5 Gbps granularity, including a service with a bandwidth less than 5 Gbps, is subject to a bearer efficiency issue in the FlexE.

A metro transport network (MTN) provides a channel forwarding function, an operation, administration, and maintenance (OAM) function, and the like based on the FlexE technology. Slot allocation corresponding to the MTN is the same as that of the FlexE, and is also performed based on a granularity of 5 Gbps. Therefore, a bearer efficiency issue also exists, especially for a service with a fine granularity bandwidth requirement, for example, a service with a bandwidth of 10 megabit per second (Mbps) or 100 Mbps.

A hard-isolated Ethernet private line technology provides channel bandwidth at a smaller granularity based on the FlexE/MTN technology. Usually, a channel with a slot granularity of 5 Gbps in the FlexE/MTN is referred to as a coarse granularity channel. A fine granularity service is carried in a coarse granularity channel. To be specific, the fine granularity service occupies N 5 Gbps. Currently, N is 1. Minimum bandwidth of a fine granularity service is 10 megabits per second (Mbps). A coarse granularity channel with a granularity of 5 Gbps provides 480 fine granularity slots for carrying fine granularity services.

In the hard-isolated Ethernet private line technology, although the bearer efficiency issue in the FlexE/MTN technology can be avoided to some extent, a latency may be large.

SUMMARY

The present disclosure provides a method for determining a transmission slot and a related apparatus, to flexibly adjust a sending slot or a receiving slot.

According to a first aspect, an embodiment of the present disclosure provides a schematic flowchart of a method for determining a transmission slot. The method includes: A target device obtains a first slot; and the target device determines a second slot based on a latency correction parameter and the first slot. A first network device includes a receive PHY device and a send PHY device. The receive PHY device includes N slots, and the send PHY device includes M slots. The first slot is one of the N slots, and the second slot is one of the M slots; or the first slot is one of the M slots, and the second slot is one of the N slots. M and N are positive integers greater than or equal to 1.

In the foregoing technical solution, a sending slot used by the first network device to send data of a target service may be determined by using the latency correction parameter and a receiving slot in which the first network device receives the data of the target service; or a receiving slot for receiving data of a target service may be determined by using the latency correction parameter and a sending slot in which the first network device sends the data of the target service. The sending slot or the receiving slot may be flexibly adjusted by selecting a proper latency correction parameter.

Optionally, the N slots and the M slots may be coarse granularity slots.

Optionally, the N slots and the M slots may be fine granularity slots.

In a possible design, the receive PHY device includes P coarse granularity slots, one or more of the P coarse granularity slots include the N slots, the send PHY device includes Q coarse granularity slots, and one or more of the Q coarse granularity slots include the M slots.

In a possible design, the latency correction parameter includes any one or more of a phase difference between a transmit end and a receive end of the first network device and an internal latency of the first network device. Due to the phase difference between the transmit end and the receive end of the first network device and the internal latency of the first network device, the first network device may need to wait for an excessive amount of time before the first network device can send received data. In the latency correction parameter in the foregoing solution, a time factor (to be specific, the phase difference between the transmit end and the receive end of the first network device and the internal latency of the first network device) that affects data sending by the first network device is considered, and a sending slot or a receiving slot of the first network device is determined based on the time factor. In this way, the first network device can send received data as soon as possible, to reduce a latency.

In a possible design, that the target device determines a second slot based on a latency correction parameter and the first slot includes: The target device determines a first reference slot based on the first slot and the latency correction parameter; and the target device determines the second slot based on the first reference slot.

In a possible design, when the first slot is one of the N slots and the second slot is one of the M slots, that the target device determines a first reference slot based on the first slot and the latency correction parameter includes: The target device determines a third slot based on the first slot, where the first slot and the third slot correspond to a same moment, and the third slot is a slot included in the send PHY device; and the target device determines the first reference slot based on the following formula:

$$SlotNumOut = \left(SlotNumberIn + (|Tp| + ||Ts|)/Tslot\right) \bmod NumberAll,$$

SlotNumOut indicates the first reference slot, SlotNumberIn indicates a slot number of the third slot, Tp indicates the internal latency of the first network device, Ts indicates the phase difference between the transmit end and the receive end of the first network device, Tslot indicates sending time of each slot, NumberAll is a value of M in the M slots, and mod indicates a modulo operation.

In a possible design, when the first slot is one of the M slots and the second slot is one of the N slots, that the target device determines a first reference slot based on the first slot and the latency correction parameter includes: The target device determines a fourth slot based on the first slot, where the first slot and the fourth slot correspond to a same moment, and the fourth slot is a slot included in the receive PHY device; and the target device determines the first reference slot based on the following formula: SlotNumOut=(SlotNumberIn+NumberAll−(|Tp|+|Ts|)/Tslot) mod NumberAll, where SlotNumOut indicates the first reference slot, SlotNumberIn indicates a slot number of the fourth slot, Tp indicates the internal latency of the first network device, Ts indicates the phase difference between the transmit end and the receive end of the first network device, Tslot indicates sending time of each slot, NumberAll is a value of M in the M slots, and mod indicates a modulo operation.

In a possible design, that the target device determines the second slot based on the first reference slot includes: determining whether the first reference slot is occupied; and if the first reference slot is not occupied, determining that the first reference slot is the second slot; or if the first reference slot is occupied, determining that a 1$^{st}$ vacant slot after the first reference slot is the second slot.

In the foregoing technical solution, it may be determined that a vacant slot closest to the first reference slot is the second slot, so that the first network device can send data without waiting until a slot with a same slot number as that of a receiving slot. This can reduce a sending latency.

In a possible design, when a type of a service occupying the first slot is a preset type, that the target device determines the second slot based on the first reference slot includes: determining whether the first reference slot is occupied; if the first reference slot is not occupied, determining that the first reference slot is the second slot; or if the first reference slot is already occupied, determining whether a type of a conflicting service is the preset type, where the conflicting service is a service occupying the first reference slot; and if the type of the conflicting service is not the preset type, determining that the first reference slot is the second slot; or if the type of the conflicting service is the preset type, determining that a 1$^{st}$ slot, after the first reference slot, that is not occupied by the preset type is the second slot.

In the foregoing technical solution, a slot occupied by another service may be preempted based on a service type. This can further reduce a sending latency.

In a possible design, the method further includes: when the first reference slot is already occupied by the conflicting service and the type of the conflicting service is not the preset type, determining that a 1$^{st}$ available slot after the first reference slot is a slot for sending the conflicting service.

In a possible design, the target device is a network management apparatus for the first network device; or the target device is the first network device.

In a possible design, when the first slot is one of the N slots and the second slot is one of the M slots, that a target device obtains a first slot includes: The target device receives a slot configuration request message, where the slot configuration request message includes an identifier of the service occupying the first slot and a slot number of the first slot.

In a possible design, that the target device receives a slot configuration request message includes: The target device receives the slot configuration request message from a second network device, where the second network device is an upstream device of the first network device; and before the target device determines the second slot based on the latency correction parameter and the first slot, the method further includes: The target device sends an acknowledgement message to the second network device, where the acknowledgement message indicates that the target device successfully receives the slot configuration request message; and the target device receives a configuration activation message from the second network device, where the configuration activation message indicates an activation condition for the second slot.

In a possible design, the latency correction parameter is preset duration, and that the target device determines a second slot based on a latency correction parameter and the first slot includes: determining a first reference moment based on the first slot; determining a second reference moment based on a 1$^{st}$ available slot after the first reference moment; and determining the second slot based on the first reference moment, the second reference moment, and the preset duration.

In the foregoing technical solution, the preset duration may be configured according to a requirement, so that an administrator can configure a sending slot or a receiving slot of a network device.

In a possible design, the determining the second slot based on the first reference moment, the second reference moment, and the preset duration includes: determining whether a difference between the second reference moment and the first reference moment is greater than the preset duration; and if the difference between the second reference moment and the first reference moment is greater than the preset duration, determining that a 1$^{st}$ vacant slot after the first reference moment is the second slot; or if the difference between the second reference moment and the first reference moment is not greater than the preset duration, determining whether a difference between a third reference moment and the first reference moment is greater than the preset threshold, and determining the second slot based on a determining result, where the third reference moment is a moment of a 1$^{st}$ available slot after the second reference moment.

In a possible design, the latency correction parameter is sending time of each slot, and that the target device determines a second slot based on a latency correction parameter and the first slot includes: determining a difference between a third reference moment and a fourth reference moment, where the third reference moment is a moment at which the first network device receives data of a service occupying the first slot, and the fourth reference moment is a moment at which the first network device sends the data of the service occupying the first slot; and determining the second slot based on the difference between the fourth reference moment and the third reference moment, a slot number of the first slot, and the sending time of each slot.

According to a second aspect, an embodiment of the present disclosure provides a computer device. The computer device includes units for implementing any one of the first aspect or the possible implementations of the first aspect.

According to a third aspect, an embodiment of the present disclosure provides a computer device. The computer device includes a processor. The processor is coupled to a memory, and is configured to read and execute instructions and/or program code in the memory, to perform any one of the first aspect or the possible implementations of the first aspect.

According to a fourth aspect, an embodiment of the present disclosure provides a chip system. The chip system includes a logic circuit. The logic circuit is coupled to an input/output interface, and is configured to transmit data through the input/output interface, to perform any one of the first aspect or the possible implementations of the first aspect.

According to a fifth aspect, an embodiment of the present disclosure provides a computer-readable storage medium. The computer-readable storage medium stores program code. When the program code runs on a computer, the computer is enabled to perform any one of the first aspect or the possible implementations of the first aspect.

According to a sixth aspect, an embodiment of the present disclosure provides a computer program product. The computer program product includes computer program code. When the computer program code runs on a computer, the computer is enabled to perform any one of the first aspect or the possible implementations of the first aspect.

BRIEF DESCRIPTION OF DRAWINGS

FIG. 6 is a schematic diagram of an example structure of a code block in a 64B/66B encoding format defined in a standard;

FIG. 13 is a schematic diagram of formats of an overhead slot configuration request message, an acknowledgement message, and a configuration activation message of an fgBU;

FIG. 15 is a schematic flowchart of another method for determining a transmission slot according to an embodiment of the present disclosure;

FIG. 16 is a schematic flowchart of a method for determining a transmission slot according to an embodiment of the present disclosure;

DESCRIPTION OF EMBODIMENTS

The following describes technical solutions of the present disclosure with reference to accompanying drawings.

In embodiments of the present disclosure, the term "at least one" indicates one or more, and "a plurality of" indicates two or more. "And/or" describes an association relationship between associated objects and indicates that three relationships may exist. For example, A and/or B may indicate the following three cases: Only A exists, both A and B exist, and only B exists, where A and B may be singular or plural. The character "/" usually indicates an "or" relationship between the associated objects. "At least one of the following items" or a similar expression thereof indicates any combination of the items, including one of the items or any combination of a plurality of the items. For example, at least one of a, b, or c may indicate a, b, c, a and b, a and c, b and c, or a, b, and c, where a, b, and c may be singular or plural.

In addition, unless otherwise specified, ordinal numbers such as "first" and "second" mentioned in embodiments of the present disclosure are intended to distinguish between a plurality of objects, but not to limit an order, a time sequence, a priority, or a degree of importance of the plurality of objects.

To help a person skilled in the art better understand technical solutions of the present disclosure, some related technologies and technical terms used in technical solutions of the present disclosure are first briefly described.

Figure 1:
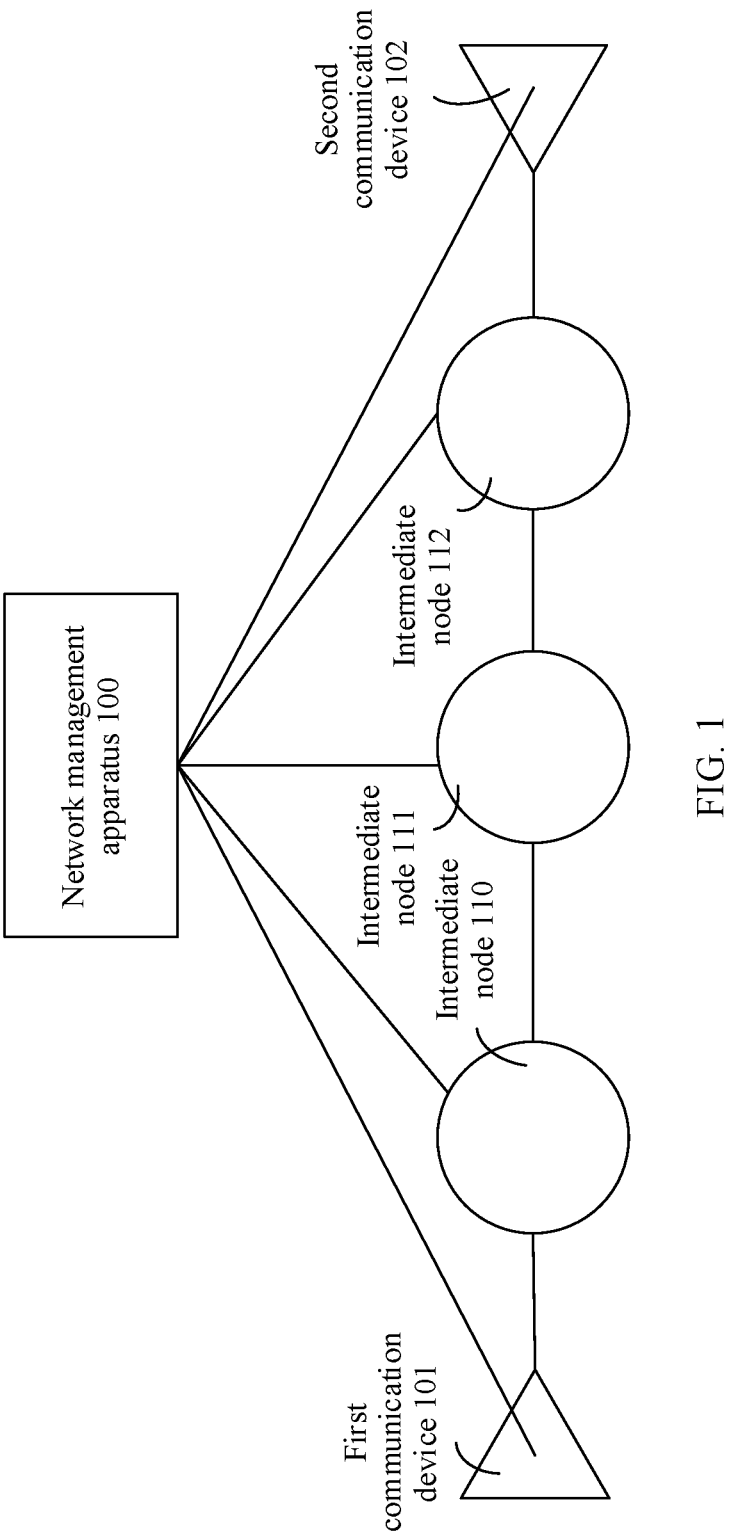
FIG. 1 is a schematic diagram of an example application scenario according to an embodiment of the present disclosure.

FIG. 1 is a schematic diagram of an example application scenario according to an embodiment of the present disclosure. The following describes an application scenario of embodiments of the present disclosure with reference to accompanying drawings.

As shown in FIG. 1, a network management apparatus 100, a first communication device 101, a second communication device 102, and several intermediate nodes shown in FIG. 1, such as an intermediate node 110, an intermediate node 111, and an intermediate node 112, are included. For any one of the network management apparatus 100, the first communication device 101, the second communication device 102, and the intermediate node, the device may be a network device, or a chip disposed in a network device. The device may be a network device that supports a fast Ethernet interface (for example, 200 G or 400 G). The device includes but is not limited to a core router, an edge router, an optical transport network (OTN) transmission device, an OTN optical service unit (OSU), a scenario-oriented internet protocol radio access network (IPRAN), a packet transport network (PTN) box-shaped or frame-shaped switch device, and the like. Nodes mentioned in subsequent embodiments may be the communication device 101, the communication device 102, the intermediate node 110, the intermediate node 111, and the intermediate node 112 shown in FIG. 1.

As shown in FIG. 1, the network management apparatus 100 may be configured to deliver some control or management information to each node, for example, may deliver bandwidth adjustment information of a channel (a coarse granularity channel and/or a fine granularity channel mentioned in subsequent content). The first communication device 101 and the second communication device 102 may transmit data to each other through the intermediate node.

Any one of the first communication device 101, the intermediate node, and the second communication device 102 in FIG. 1 may include a sending module and a receiving module. In other words, any one of the first communication device 101, the intermediate node, and the second communication device 102 may serve as a transmit end 121 in FIG. 2, or may serve as a receive end 122 in FIG. 2 in some cases.

Figure 2:
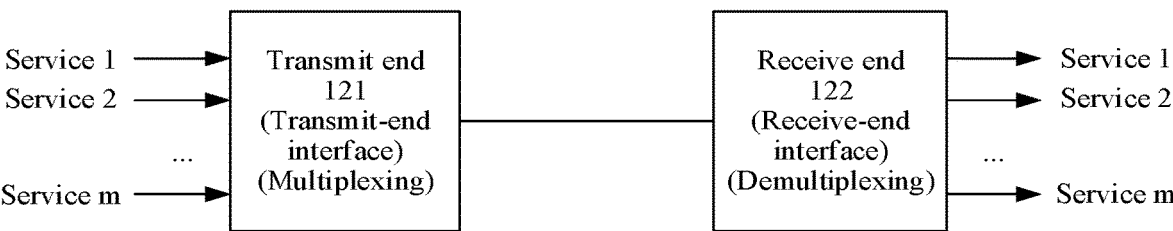
FIG. 2 is a schematic diagram of an example architecture of data transmission between two devices in FIG. 1.

FIG. 2 is a schematic diagram of an example architecture of data transmission between two devices in FIG. 1. As shown in FIG. 2, the solution in this embodiment of the present disclosure may be applied between device interfaces between the transmit end 121 and the receive end 122, for example, applied between a transmit-end interface and a receive-end interface. In this embodiment of the present disclosure, one or more services (for example, a service 1, a service 2, . . . , and a service m in FIG. 2) may be multiplexed at the transmit end, multiplexed data is transmitted to the receive end 122, and the receive end 122 demultiplexes the multiplexed data to restore the services. In this embodiment of the present disclosure, a service between the transmit end 121 and the receive end 122 may be dynamically adjusted. For example, a service is added, a service is deleted, service bandwidth is increased, or service bandwidth is decreased. In this embodiment of the present disclosure, the transmit-end interface and the receive-end interface may be FlexE interfaces, OTN interfaces, Ethernet interfaces, or the like, or channels obtained by dividing these interfaces.

Figure 3:
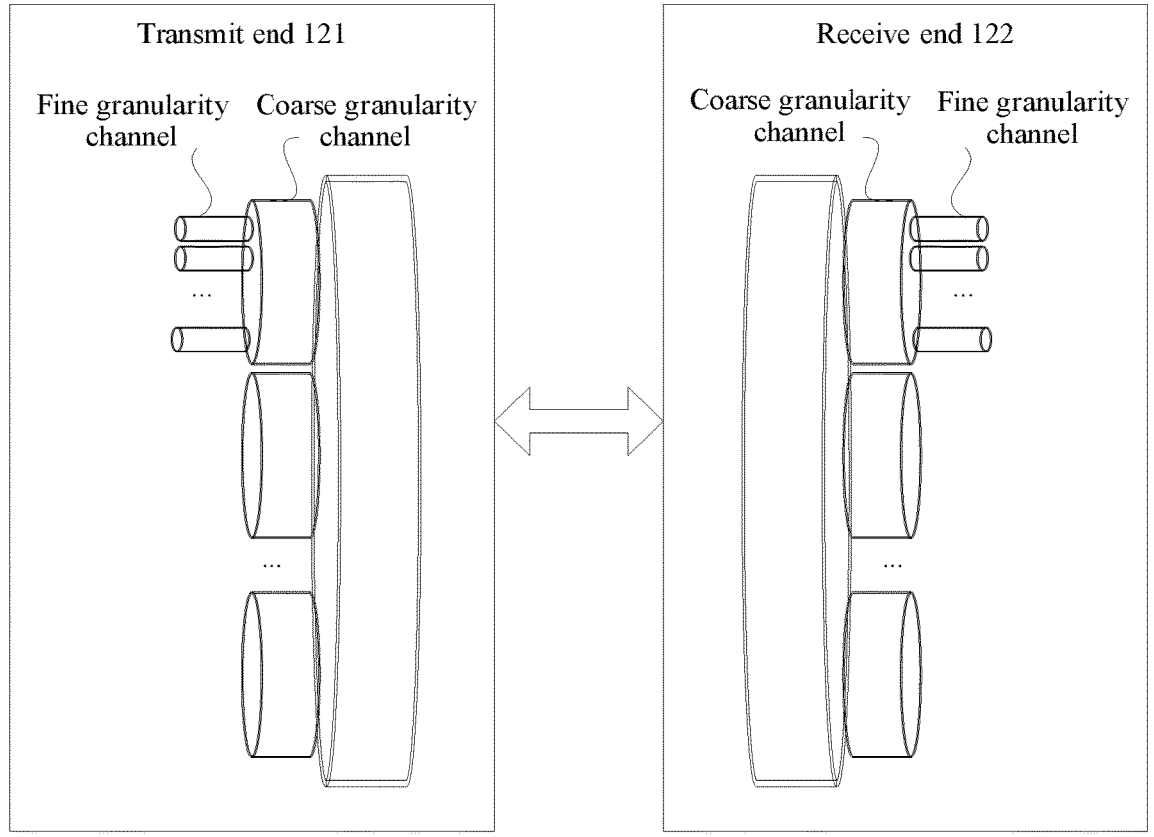
FIG. 3 shows an example of a possible channel division solution based on FIG. 2.

FIG. 3 shows an example of a possible channel division solution based on FIG. 2. As shown in FIG. 3, an interface of the transmit end 121 and an interface of the receive end 122 are divided into channels. In this embodiment of the present disclosure, two terms are defined: a coarse granularity channel and a fine granularity channel. The coarse granularity channel and the fine granularity channel are defined relative to each other. A coarse granularity channel may be divided into at least two fine granularity channels, and bandwidth of the coarse granularity channel is higher than bandwidth of the fine granularity channels. In this embodiment of the present disclosure, slot allocation in a FlexE/MTN is performed at a granularity of 5 Gbps, and a channel with a slot granularity of 5 Gbps in the FlexE/MTN is referred to as a coarse granularity channel. A hard-isolated Ethernet private line technology provides channel bandwidth at a smaller granularity based on the FlexE/MTN technology. A channel that has a smaller bandwidth granularity and that is provided in the hard-isolated Ethernet private line technology may be referred to as a fine granularity channel. The fine granularity channel is used to carry one or more fine granularity services.

In this embodiment of the present disclosure, a fine granularity service may be defined relative to a coarse granularity service. The fine granularity service may be a service whose bandwidth is lower than bandwidth of a coarse granularity channel. For example, a service with a bandwidth requirement of 10 Mbps or 100 Mbps may be referred to as a fine granularity service. In this embodiment of the present disclosure, a node that needs to multiplex or demultiplex a fine granularity service is referred to as a fine granularity node, and a node that needs to multiplex and demultiplex a coarse granularity service is referred to as a coarse granularity node. A node on a transmission path may or may not be a fine granularity node.

Figure 4A:
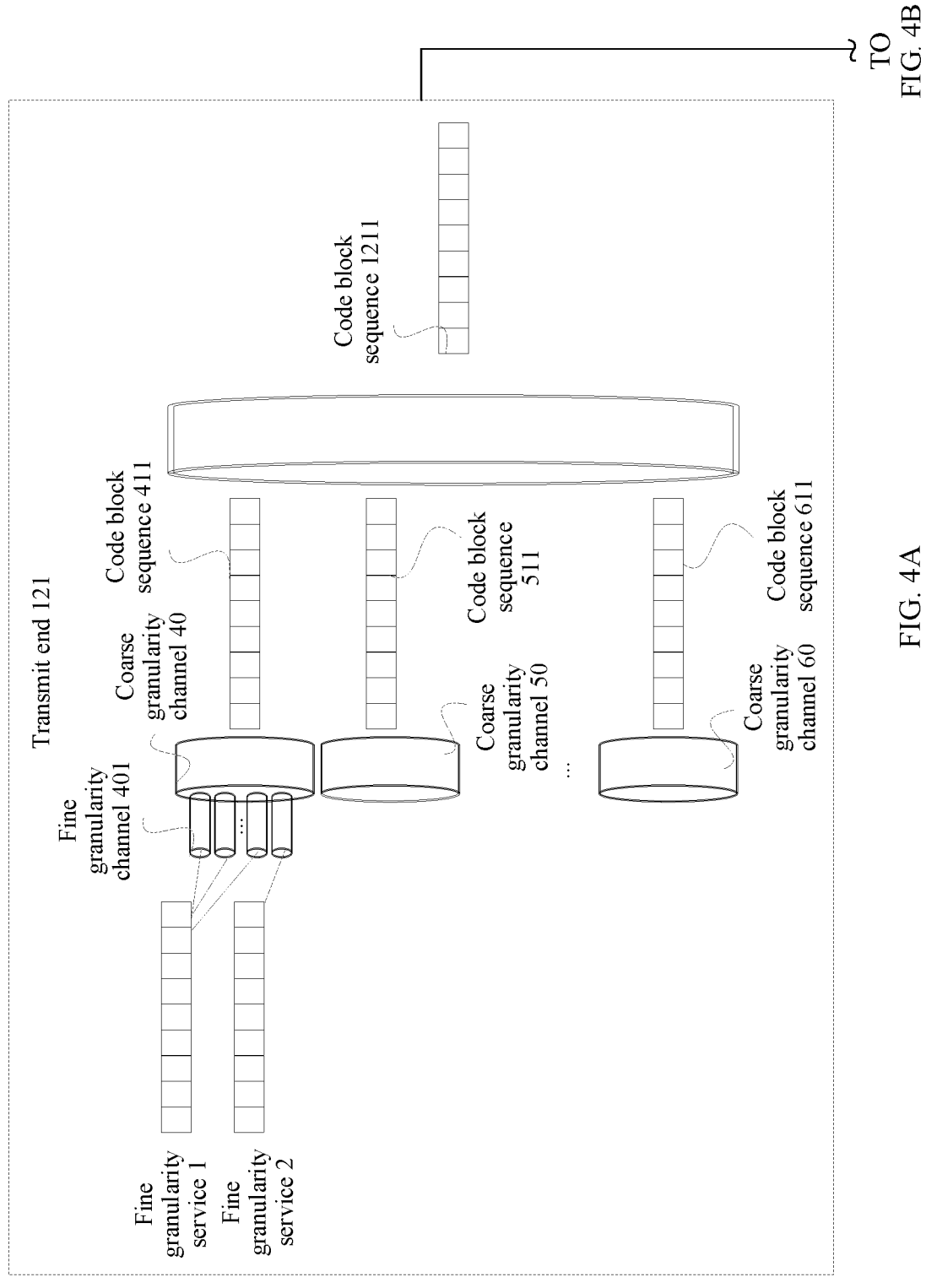
FIG. 4A and FIG. 4B are a schematic diagram of an example of a possible data transmission process based on FIG. 3.
Figures 4A, 4B:

FIG. 4A and FIG. 4B are a schematic diagram of an example of a possible data transmission process based on FIG. 3. As shown in FIG. 4A and FIG. 4B, each of a fine granularity service 1 and a fine granularity service 2 may correspond to one or more fine granularity channels 401. A code block sequence of each fine granularity service is multiplexed based on the correspondence between the fine granularity service and the fine granularity channel, to obtain a code block sequence 411 corresponding to a coarse granularity channel 40. The transmit end 121 includes 20 slots, and each coarse granularity channel corresponds to one slot. Coarse granularity channels other than the coarse granularity channel 40 are used to carry coarse granularity services. There is a correspondence between the coarse granularity services and the slots. In other words, there is a correspondence between the coarse granularity services and the coarse granularity channels. Then code block sequences corresponding to the coarse granularity channels (for example, the code block sequence 411 shown in the figure, a code block sequence 511 corresponding to a coarse granularity channel 50, and a code block sequence 611 corresponding to a coarse granularity channel 60) are multiplexed to obtain a code block sequence 1211. Then the code block sequence 1211 is sent to the receive end 122.

As shown in FIG. 4A and FIG. 4B, the receive end 122 demultiplexes the code block sequence 1211 to obtain the code block sequences corresponding to the coarse granularity channels, for example, the code block sequence 411, the code block sequence 511, and the code block sequence 611 shown in the figure. In FIG. 4A and FIG. 4B, the receive end 122 further demultiplexes the code block sequence 411 to obtain the fine granularity service 1 and the fine granularity service 2.

However, it should be noted that, for an intermediate node, the intermediate node may re-demultiplex a code block sequence output by a coarse granularity channel, to obtain a code block sequence of a fine granularity service. In this case, the intermediate node may be referred to as a coarse granularity node, or may be referred to as a fine granularity node. In another case, the intermediate node may not demultiplex a code block sequence output by a coarse granularity pipe, but directly re-multiplex the code block sequence 411 corresponding to the coarse granularity channel 40 with data of another service and send multiplexed data to a next hop. In this case, the intermediate node may be referred to as a coarse granularity node, but cannot be referred to as a fine granularity node. That is, for the intermediate node, a fine granularity service is invisible to the intermediate node. This problem may be further described below by using FIG. 5.

Figure 5:
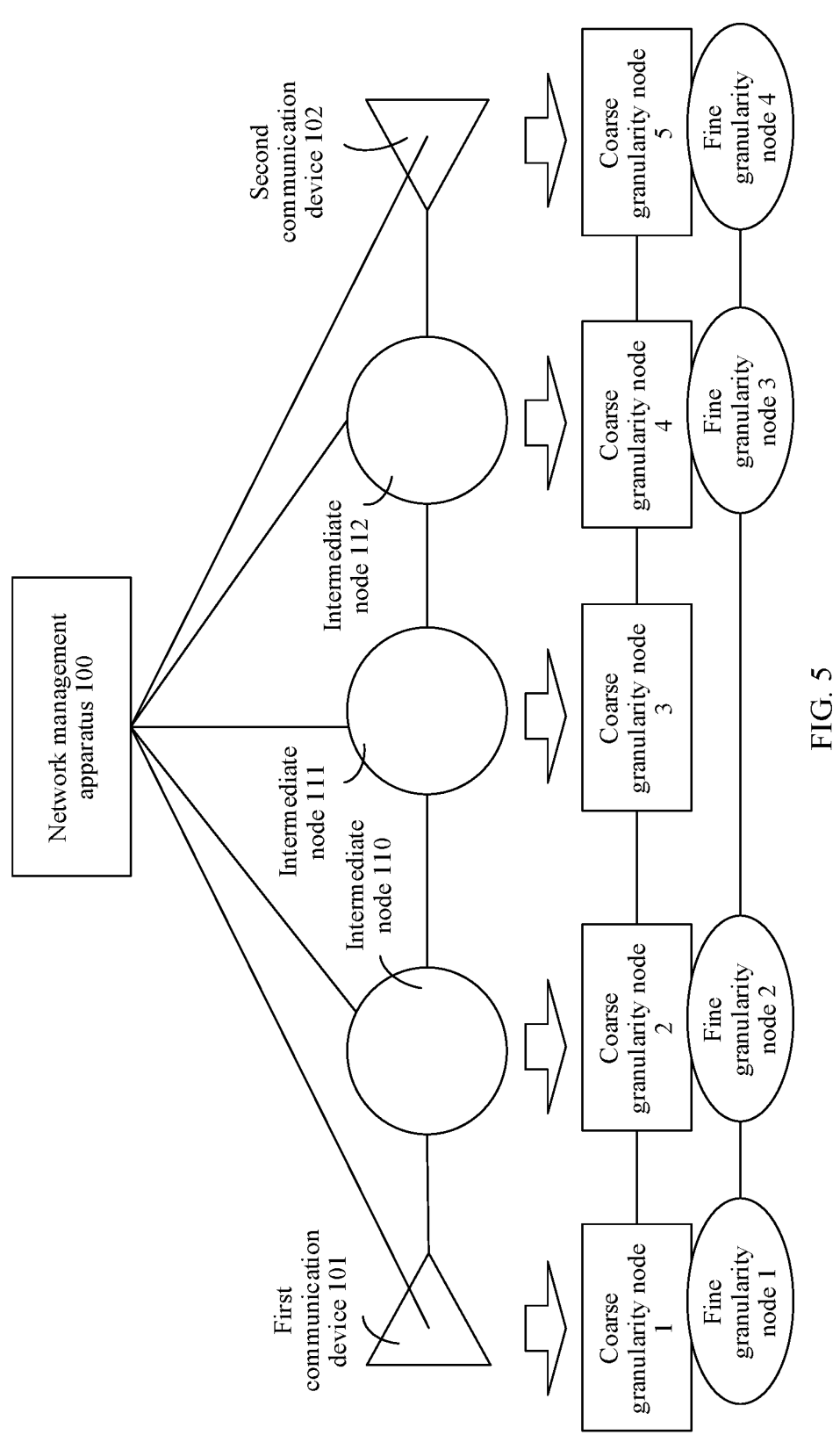
FIG. 5 shows an example of a possible data transmission solution based on FIG. 1.

FIG. 5 shows an example of a possible data transmission solution based on FIG. 1. As shown in FIG. 5, the first communication device 101 serves as the transmit end 121, multiplexes a fine granularity service carried in a coarse granularity channel, and re-multiplexes multiplexed data with a service in another coarse granularity channel. The first communication device 101 sends a multiplexed coarse granularity service to the intermediate node 110 (in this case, the intermediate node 110 serves as the receive end 122). It can be learned that the first communication device 101 is both a coarse granularity node and a fine granularity node. The intermediate node 110 demultiplexes received data once to obtain data corresponding to each coarse granularity channel, and the intermediate node 110 further re-demultiplexes the data corresponding to the coarse granularity channel to obtain a fine granularity service. It can be learned that the intermediate node 110 is both a coarse granularity node and a fine granularity node.

Further, the intermediate node 110 in FIG. 5 serves as the transmit end 121, multiplexes a fine granularity service carried in a coarse granularity channel, re-multiplexes multiplexed data with a service in another coarse granularity channel, and sends multiplexed data to the intermediate node 111 (in this case, the intermediate node 111 serves as the receive end 122). The intermediate node 111 demultiplexes received data once to obtain data corresponding to each coarse granularity channel. The intermediate node 111 does not need to re-demultiplex data corresponding to a coarse granularity channel 1, that is, does not need to obtain each fine granularity service, but directly sends the data corresponding to each coarse granularity channel to the intermediate node 112. It can be learned that the intermediate node 111 is only a coarse granularity node, but not a fine granularity node. Subsequent content is similar to the foregoing content, and details are not described again.

It can be learned from the content shown in FIG. 5 that, in a fine granularity pass-through mode, a coarse granularity node does not sense existence of a fine granularity service, but only forwards a service of a coarse granularity channel. For example, the intermediate node 111 serves as a coarse granularity node 3. In a fine granularity switching mode, a coarse granularity node senses existence of a fine granularity service, demultiplexes (or referred to as decapsulation) the fine granularity service, and forwards demultiplexed data. For example, the first communication device 101 serves as a coarse granularity node 1 and a fine granularity node 1, the intermediate node 110 serves as a coarse granularity node 2 and a fine granularity node 2, the intermediate node 112 serves as a coarse granularity node 4 and a fine granularity node 3, and the second communication device 102 serves as a coarse granularity node 5 and a fine granularity node 4. In a possible implementation, for a coarse granularity node, a three-end link may exist, for example, three links between the coarse granularity node 1 and the coarse granularity node 2, between the coarse granularity node 2 and the coarse granularity node 3, between the coarse granularity node 3 and the coarse granularity node 4, and between the coarse granularity node 4 and the coarse granularity node 5. For a fine granularity node, only one end-to-end link exists, for example, a link between the fine granularity node 1 and the fine granularity node 4. It should be noted that, adjustment of total bandwidth of a fine granularity channel occurs only on a first node of each coarse granularity link, for example, between the coarse granularity node 1 and the coarse granularity node 2, between the coarse granularity node 2 and the coarse granularity node 4, and between the coarse granularity node 4 and the coarse granularity node 5; and also occurs only between adjacent fine granularity nodes, for example, between the fine granularity node 1 and the fine granularity node 2, between the fine granularity node 2 and the fine granularity node 3, and between the fine granularity node 3 and the fine granularity node 4.

It should be noted that the solution provided in this embodiment of the present disclosure is applicable to a case in which there is only a coarse granularity channel, to be specific, the coarse granularity channel is not divided into fine granularity channels; and is also applicable to a case in which there are a coarse granularity channel and a fine granularity channel. This is not limited in this embodiment of the present disclosure. For ease of description of subsequent content, the subsequent content is described in a case in which there are both a coarse granularity channel and a fine granularity channel.

The following describes some nouns and terms used in embodiments of the present disclosure.

(1) Code Block

A code block mentioned in embodiments of the present disclosure is one bit or a plurality of consecutive bits, and information carried in a code block may be information carried in a bit included in the code block. The code block in embodiments of the present disclosure may also have another alternative name. For example, the code block may be replaced with a data unit, or may be replaced with a flit. It should be noted that some of embodiments of the present disclosure that are described by using a code block as an example are also applicable to a flit scenario.

The code block in embodiments of the present disclosure may include two types: a data-type code block and a control-type code block. A bit in the data-type code block may be used to carry an actual valid data payload, and a bit in the control-type code block may be used to carry control information.

The control-type code block may be further divided into a plurality of types of code blocks, for example, a head code block, a tail code block, an idle code block, an operation, administration, and maintenance code block, an error code block, and a low power code block.

FIG. 6 is a schematic diagram of an example structure of a code block in a 64B/66B encoding format defined in a standard. As shown in FIG. 6, the code block is defined in SECTION SIX of the following standard: IEEE Std 802.3-2018 IEEE Standard for Ethernet. As shown in FIG. 6, a synchronization header region of a code block includes a bit 0 and a bit 1 of the code block, and the synchronization header region of the code block may be in two cases: 01 and 10. A code block with a synchronization header of 01 is referred to as a data block, and a code block with a synchronization header of 10 is referred to as a control block.

A field D0 of the control block occupies 8 bits, and may be referred to as a type field of the control block. In this embodiment of the present disclosure, a code block with a synchronization header of 10 and a type field of 0x78 may be referred to as an S block.

The code block in embodiments of the present disclosure is described by using the code block structure form shown in FIG. 6 as an example. However, embodiments of the present disclosure are also applicable to a code block form defined in another standard, for example, 8B/10B or 256B/257B.

(2) Code Block Sequence

In embodiments of the present disclosure, a data stream formed by using a code block as a unit is referred to as a code block sequence, for example, a first code block sequence and a second code block sequence in embodiments of the present disclosure. The code block sequence in embodiments of the present disclosure may also have another name, for example, is referred to as a code block stream. The name is not specifically limited in embodiments of the present disclosure.

(3) FlexE

Similar to an OTN, the FlexE has concepts of a FlexE client layer and a FlexE server layer. The FlexE client layer mainly supports aggregation of client signals, for example, is a 10 Gigabit (G), 25 G, 40 G, or N×50 G Ethernet interface. The FlexE service layer is a functional layer mainly used to carry a FlexE client signal. Currently, the FlexE service layer is implemented mainly by using N 100 Gigabit Ethernet (GE) PHY devices, and may alternatively be implemented by using N 400GE PHY devices (PHYs) in the future.

A PHY layer device is mainly a physical Ethernet interface, and includes a physical coding sub-layer (PCS), a physical medium attachment (PMA) sub-layer, and a physical medium dependent (PMD) sub-layer.

A FlexE Group is a group of 1 to n bonded Ethernet PHYs, where a value of n is equal to 254. For example, the FlexE group may be one bonded Ethernet PHY device, the FlexE group may be two bonded Ethernet PHYs, or the FlexE group may be five bonded Ethernet PHYs.

For one bonded Ethernet PHY device, one send PHY device is bonded to one receive PHY device. The number of send PHYs is equal to the number of receive PHYs.

For a plurality of bonded Ethernet PHYs, a plurality of send PHYs are respectively bonded to a plurality of receive PHYs. The number of the plurality of send PHYs is equal to the number of the plurality of receive PHYs.

The send PHY device is a PHY device for sending data.

The receive PHY device is a PHY device for receiving data.

All PHYs in the present disclosure are Ethernet PHYs.

An example in which a channel with a slot granularity of 5 Gbps in the FlexE is a coarse granularity channel is used for description. It should be noted that, in embodiments of the present disclosure, bandwidth of a coarse granularity channel is not limited to 5 Gbps, and for example, may alternatively be 6 Gbps or 7 Gbps.

Figure 7:
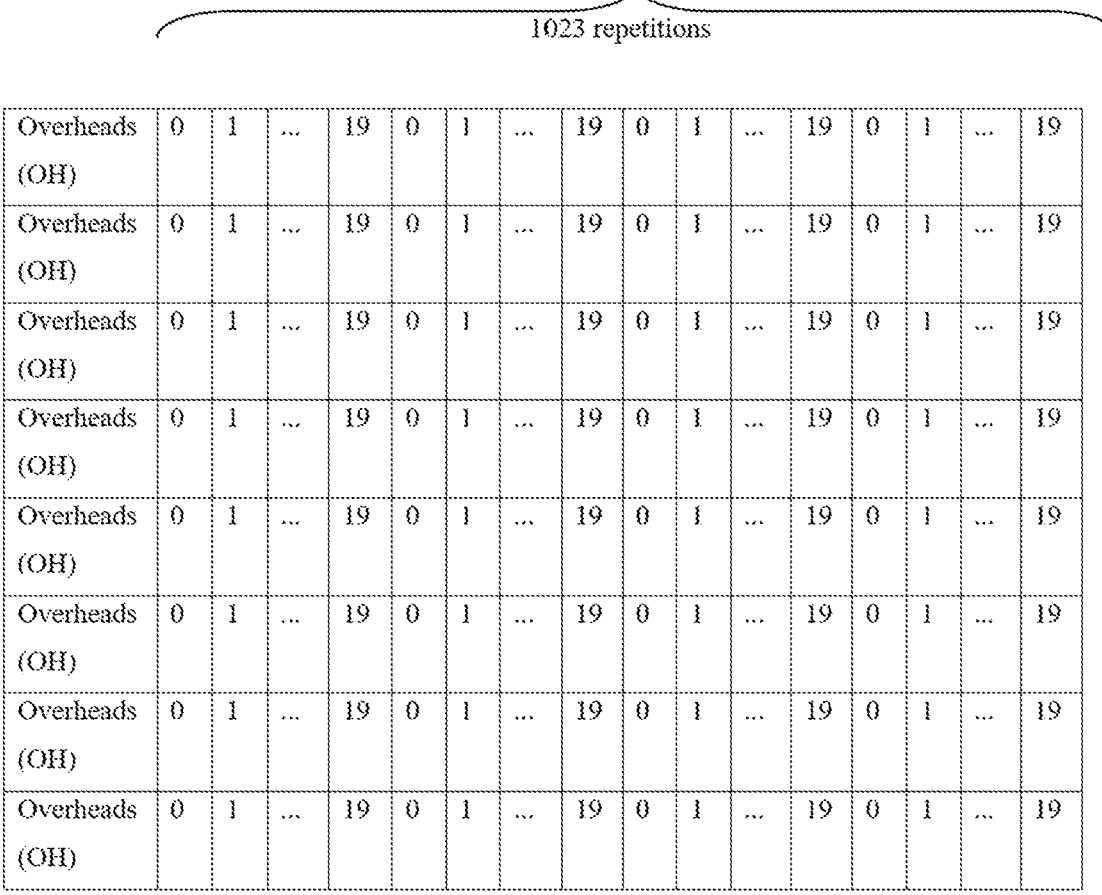
FIG. 7 is a schematic diagram of an example structure of a frame format of a flexible Ethernet protocol according to an embodiment of the present disclosure.

FIG. 7 is a schematic diagram of an example structure of a frame format of a flexible Ethernet protocol according to an embodiment of the present disclosure. A frame format in the code block sequence 1211 output by the transmit end 121 in FIG. 4A and FIG. 4B may be the frame format of the flexible Ethernet protocol. As shown in FIG. 7, a fixed frame format may be constructed for transmission of a physical port according to the flexible Ethernet protocol, and time division multiplexing (TDM)-based slot division is performed. For a 100GE PHY port, a data block stream may include 64B/66B blocks based on a cycle of 20, and correspond to 20 slots, and bandwidth of each slot is 5 Gbps. A slot is defined in this manner.

As shown in FIG. 7, a time division multiplexing frame structure constructed based on 64B/66B blocks may be used in the flexible Ethernet. Data at all PHYs in the FlexE is aligned by periodically inserting FlexE overhead (OH) blocks. For example, one 66B OH block FlexE OH may be inserted at an internal of 1023×20 66B payload data blocks.

As shown in FIG. 7, 66B blocks in eight rows (each row includes one OH block and 1023×20 data) constitute a protocol frame (the protocol frame may also be referred to as a basic frame, a base frame, a single frame, or the like) in the flexible Ethernet protocol. As shown in FIG. 7, 32 protocol frames in the flexible Ethernet protocol constitute a multiframe in the flexible Ethernet protocol.

In a possible implementation solution, in a 1$^{st}$ OH block of the protocol frame in the flexible Ethernet protocol, a 0x4B field in bits 0 to 7 and a 0x5 field in bits 32 to 35 jointly constitute a frame header indication flag field of a FlexE frame OH block. Two management channels are defined in the FlexE OH, and the management channels may be used to run a 1.2 megabits per second (Mb/s) Ethernet protocol-based management and OAM communication link and a 1.8 Mb/s Ethernet protocol-based management and OAM communication link that are encoded based on a 64B/66B block sequence. Further, in embodiments of the present disclosure, 64B/66B encoding may be used in a scenario of a 100GE physical layer.

The FlexE frame structure is reused in an International Telecommunication Union Telecommunication Standardization Sector (ITU-T) MTN. Therefore, a frame structure of the ITU-T MTN is the same as the FlexE frame structure.

(4) fgBU of a Hard-Isolated Ethernet Private Line

The fgBU may also be referred to as a fine granularity base frame or a flexible fine granularity. A length of the fgBU is usually 197 64B/66B blocks (1567 bytes before encoding). The fgBU includes a 7-byte fgBU OH, a 1560-byte payload, an 8-byte encapsulation header (preamble), and a 1-byte end of frame delimiter (EFD).

Figure 8:
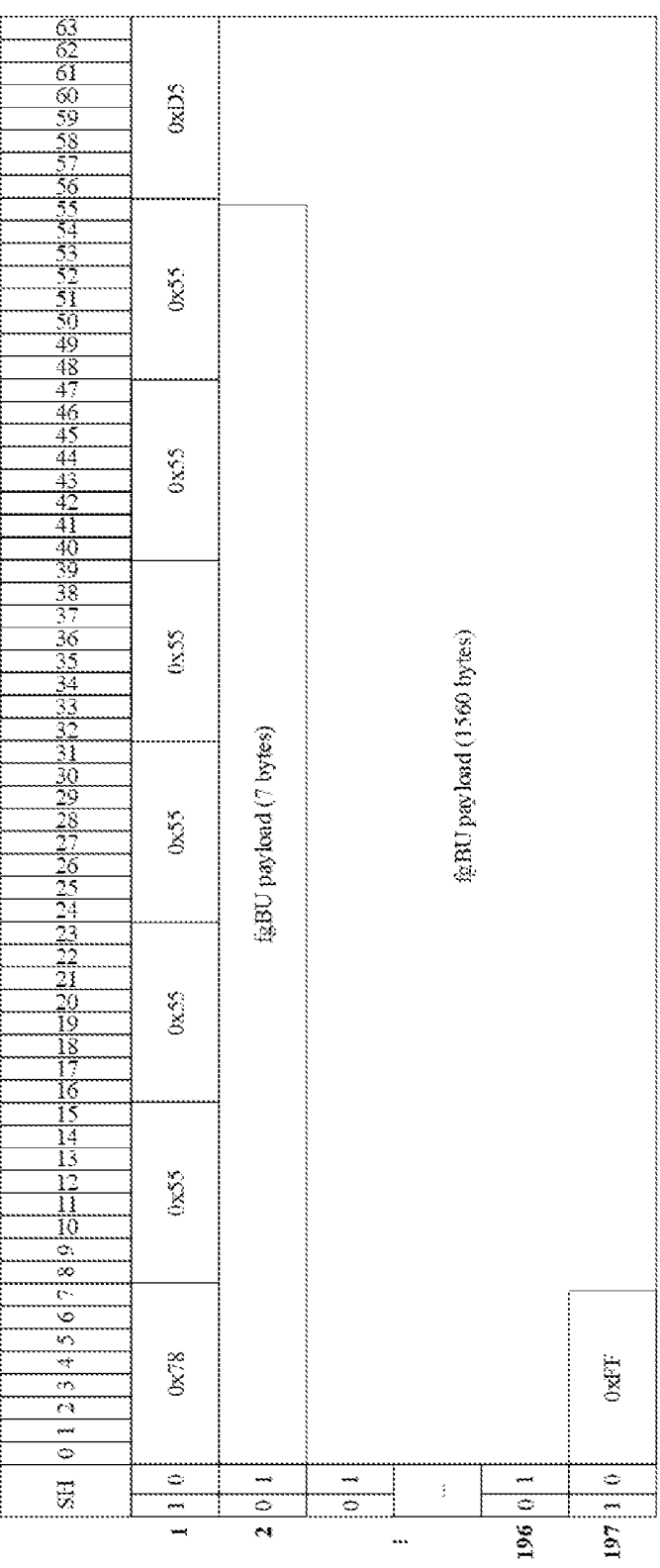
FIG. 8 is a schematic diagram of a structure of a fine granularity basic unit (fgBU)

FIG. 8 is a schematic diagram of a structure of an fgBU.

The fgBU shown in FIG. 8 includes: an 8-byte encapsulation header, where type fields are 0x78, 0x55, and 0xD5; a 7-byte fgBU OH; a 1560-byte fgBU payload; and a 1-byte EDF (a type field is 0xFF).

In addition, each fgBU may be followed by an 8-byte inter-packet gap (IPG) (not shown in FIG. 8). The IPG may be idle time between two fgBUs.

Data carried by the fgBU is obtained through multiplexing of a plurality of services. In other words, data carried in a data-type code block in the fgBU may come from different services. If the fgBU is demultiplexed, data of the services may be obtained.

When the fgBU is carried in a 5 Gbps FlexE/MTN slot, one fgBU is a frame, and 20 consecutive fgBUs constitute a complete fgBU multiframe. Each multiframe period is 50.688 microseconds (µs). Each fgBU is identified by a multiframe indication (MFI). Each fgBU includes 24 fine granularity slots (fgSlot). Therefore, one fgBU multiframe includes a total of 480 fine granularity slots. For a client signal, a client signal service stream is allocated, based on preset slot configuration information, to a corresponding slot for transmission.

Figure 9:
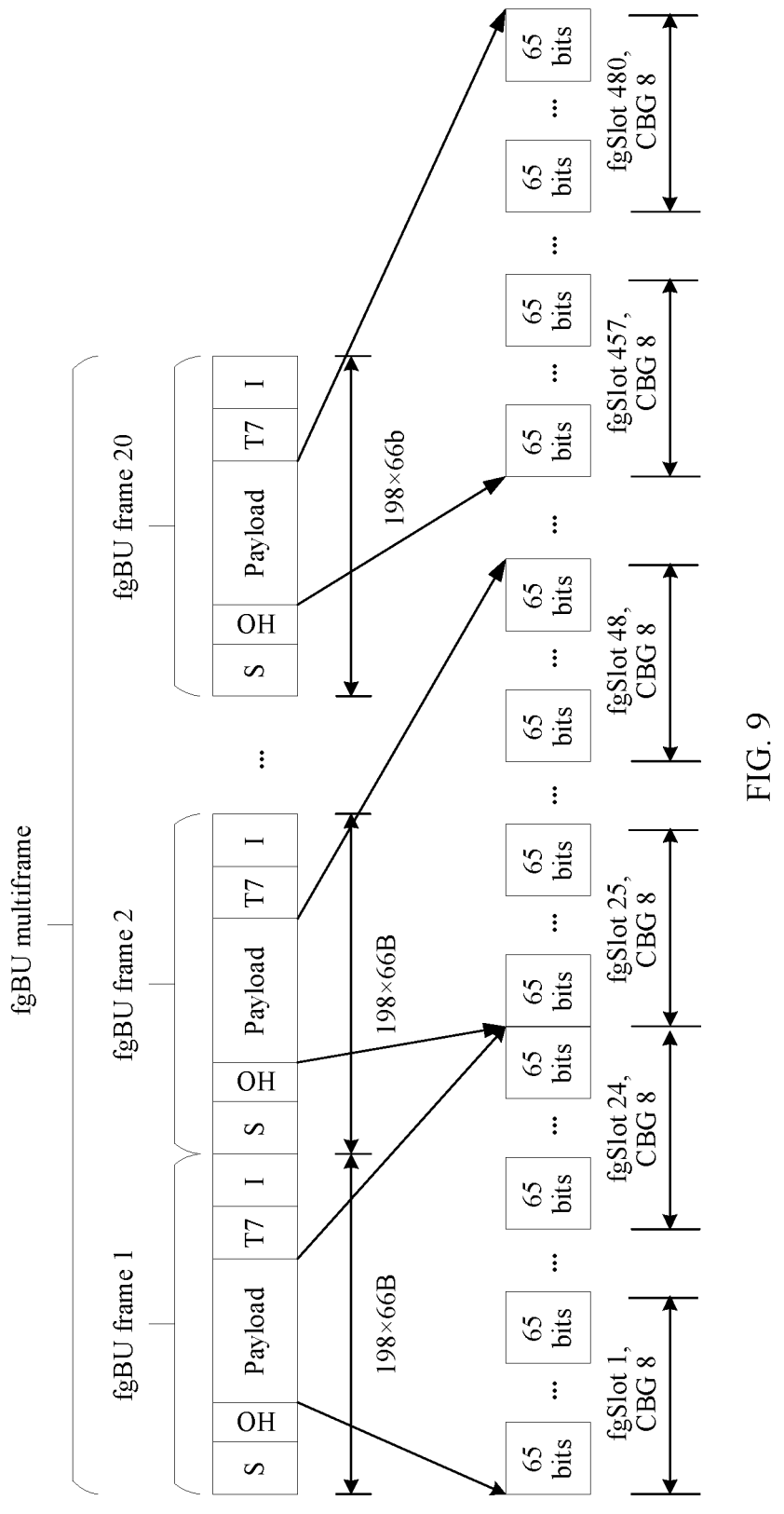
FIG. 9 is a schematic diagram of an fgBU multiframe.

FIG. 9 is a schematic diagram of an fgBU multiframe.

As shown in FIG. 9, one fgBU frame (for example, an fgBU frame 1) is an fgBU. An S block in the fgBU frame is the 8-byte encapsulation header in the fgBU structure shown in FIG. 8, an OH block is the 7-byte fgBU OH in the fgBU structure shown in FIG. 1, a payload block is the 1560-byte fgBU payload in the fgBU structure shown in FIG. 8, a T7 block is the EDF in the fgBU structure shown in FIG. 8, and an I block is the IPG.

As shown in FIG. 9, a length of an fgBU frame is 198 66B blocks. An fgBU includes 24 fgSlots. For example, the fgBU frame 1 includes an fgSlot 1 to an fgSlot 24, an fgBU frame 2 includes an fgSlot 25 to an fgSlot 48, and an fgBU frame 20 includes an fgSlot 457 to an fgSlot 480.

A compressed code group (CBG) is a compressed code group including n 64B/66B—compressed code blocks (65B). For example, a CBG 8 shown in FIG. 9 is a compressed code group including eight 64B/66B-compressed code blocks (65B).

Assuming that bandwidth of each fgBU multiframe is 5 Gbps and bandwidth of a send PHY device or receive PHY device is 100 Gbps, 20 fgBU multiframes may be multiplexed to obtain a FlexE/MTN frame, and each of the 20 fgBU multiframes comes from each 5 Gbps coarse granularity slot.

Figure 10:
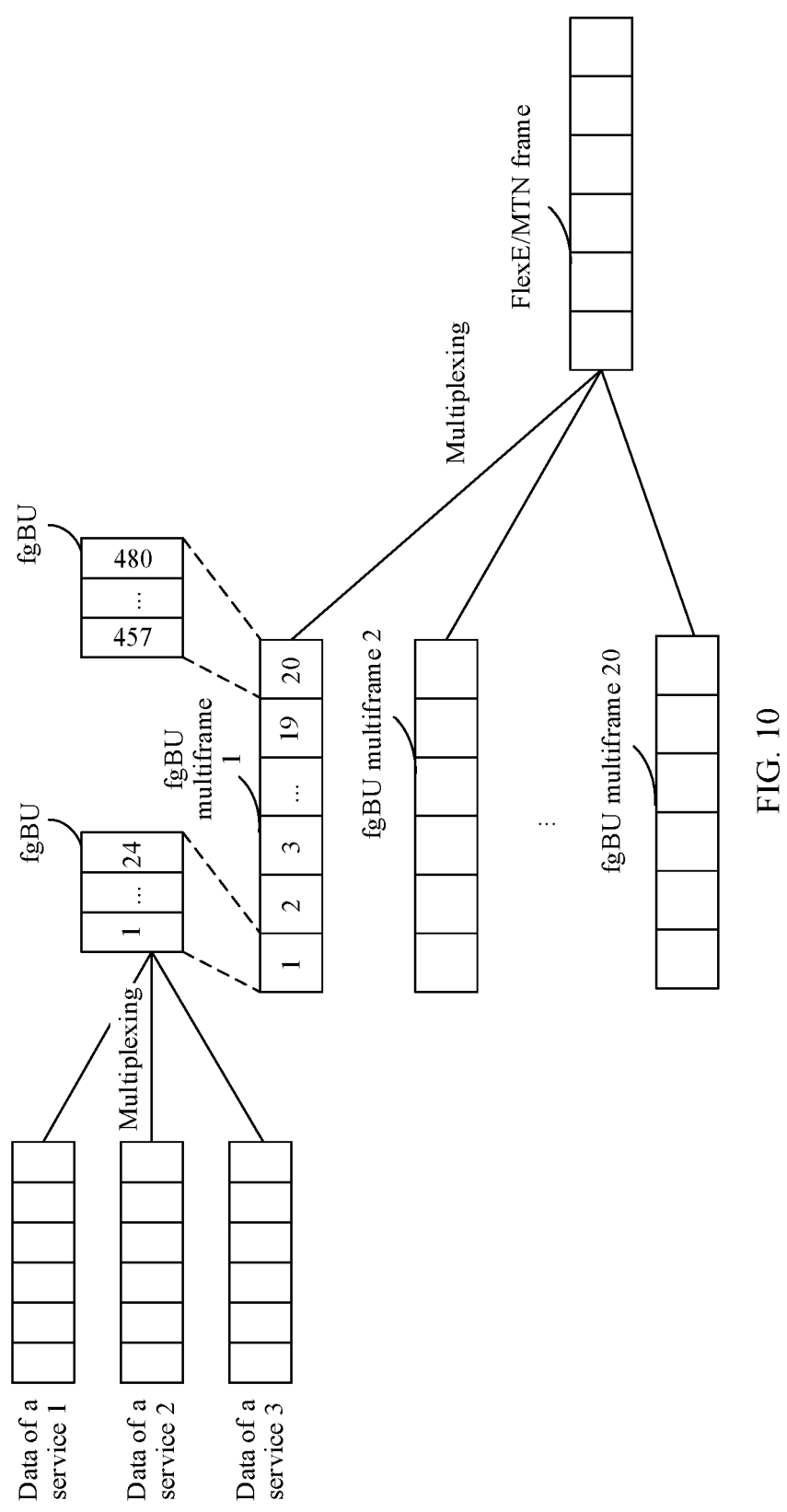
FIG. 10 is a schematic diagram of a relationship between service data, an fgBU, an fgBU multiframe, and a FlexE frame.

FIG. 10 is a schematic diagram of a relationship between service data, an fgBU, an fgBU multiframe, and a FlexE frame.

As shown in FIG. 10, data of a fine granularity service 1, data of a fine granularity service 2, and data of a fine granularity service 3 are multiplexed to obtain an fgBU. 20 fgBUs constitute an fgBU multiframe. 20 fgBU multiframes are multiplexed to obtain a FlexE/MTN frame.

It can be understood that FIG. 10 shows a relationship between service data, an fgBU, an fgBU multiframe, and a FlexE frame at a transmit end. Correspondingly, at a receive end, a FlexE frame may be demultiplexed to obtain an fgBU multiframe 1 to an fgBU multiframe 20, and the fgBU multiframe includes 20 fgBUs. The fgBU may be demultiplexed to obtain the data of the fine granularity service 1, the data of the fine granularity service 2, and the data of the fine granularity service 3.

A slot relationship between an fgBU and an fgBU multiframe in embodiments of the present disclosure is described by using the fgBU multiframe structure form shown in FIG. 9 as an example. However, embodiments of the present disclosure are also applicable to an fgBU and an fgBU multiframe defined in another standard. For example, an fgBU may include N slots, and an fgBU multiframe may include M fgBUs, where N and M may be positive integers greater than or equal to 1. For example, N may be equal to 12, 24, or 48, and M may be equal to 4, 8, 16, 20, or 40.

Similarly, in some descriptions of the present disclosure, it is assumed that slot allocation in the FlexE/MTN is performed based on a granularity of 5 Gbps, and a FlexE/MTN frame is 20 slots. To be specific, bandwidth of a FlexE/MTN frame is 100 Gbps, and a fine granularity channel is 10 M. A person skilled in the art can understand that, during slot allocation in the FlexE/MTN, a quantity of slots included in a FlexE/MTN frame and bandwidth of a fine granularity channel may alternatively be other values. For example, slot allocation in the FlexE/MTN is performed at a granularity of 1 Gbps or 10 Gbps, and a FlexE/MTN frame is 5 or 10 slots. To be specific, bandwidth of a FlexE/MTN frame is 20 Gbps, 200 Gbps, or the like, and a fine granularity channel is 20 M, 100 M, or the like.

As described above, in embodiments of the present disclosure, a data stream formed by using a code block as a unit is referred to as a code block sequence, and an fgBU includes 197 64B/66B blocks. Therefore, an fgBU may be referred to as a code block sequence. Further, an fgBU multiframe includes 20 fgBUs. Therefore, an fgBU multiframe may also be referred to as a code block sequence. A FlexE/MTN frame may also include a plurality of code blocks. Therefore, a FlexE/MTN frame may also be referred to as a code block sequence. For ease of description, a FlexE/MTN frame may be referred to as a first code block sequence, an fgBU multiframe may be referred to as a second code block sequence, and an fgBU may be referred to as a third code block sequence. Data carried in the third code block sequence is obtained through multiplexing of a plurality of pieces of data. The second code block sequence may include a plurality of third code block sequences, and a plurality of second code block sequences may be multiplexed to obtain the first code block sequence. Correspondingly, the first code block sequence may be demultiplexed to obtain the second code block sequences. The third code block sequence may be demultiplexed to obtain data of a plurality of services.

In embodiments of the present disclosure, data may be short for data carried in a data-type code block in an fgBU (for example, data of a target service in embodiments of the present disclosure is a data-type code block in an fgBU, and the code block carries the data of the target service). In embodiments of the present disclosure, a slot may be short for an fgSlot. In embodiments of the present disclosure, a frame may be short for an fgBU frame. In embodiments of the present disclosure, a multiframe may be short for an fgBU multiframe. If a slot of a fine granularity channel (that is, an fgSlot) needs to be distinguished from a slot of a coarse granularity channel, a fine granularity slot or a slot may be short for the slot of the fine granularity channel, and a coarse granularity slot may be short for the slot of the coarse granularity channel.

(5) Phase Difference

A frame header of a multiframe at a transmit end of a node is not aligned with a frame header of a multiframe at a receive end due to a device, an environment, or other factors. A difference between start moments of multiframes with a same frame number at a transmit end and a receive end of a same node may be referred to as a phase difference between the transmit end and the receive end of the node.

The phase difference may also be referred to as a time difference.

Figure 11:
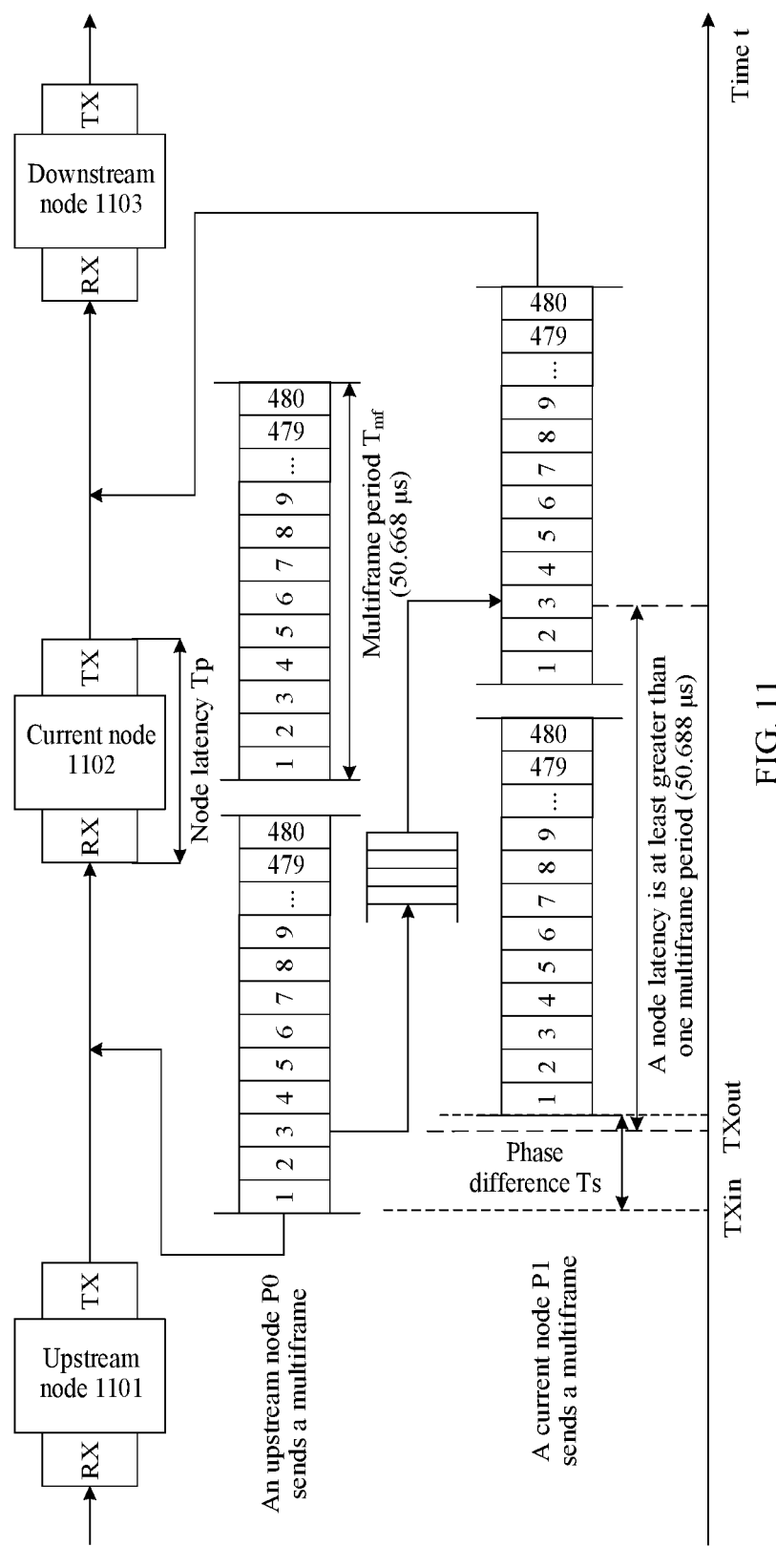
FIG. 11 is a schematic diagram of sending a service signal.

FIG. 11 is a schematic diagram of sending a service signal. As shown in FIG. 11, for a same multiframe, a start moment at a receive (RX) end of a current node 1102 is TXin, a start moment at a transmit (TX) end is TXout, and the TXout is later than the TXin. Therefore, a difference between the TXout and the TXin is a phase difference (which may be denoted as Ts) between the transmit end and the receive end of the current node.

Further, a phase difference also exists between transmit ends of two adjacent nodes. The phase difference between the transmit ends of the two adjacent nodes may be the same as a phase difference between downstream nodes of the two adjacent nodes.

For example, as shown in FIG. 11, a phase difference also exists between a transmit end of an upstream node 1101 and the transmit end of the current node 1102. The phase difference between the transmit end of the upstream node 1101 and the transmit end of the current node 1102 may be equal to the phase difference between the transmit end and the receive end of the current node 1102.

(6) Internal Latency of a Node

In a process from a moment at which a node receives data through an RX to a moment at which the node sends the data through a TX, the node needs to perform a series of processing (for example, demultiplexing, data processing, and multiplexing) on the data. A latency caused by the series of operations may be referred to as an internal latency of the node.

In the hard-isolated Ethernet private line technology, a 5 Gbps-based FlexE/MTN channel is divided into 480 10 Mbps fine granularity slots. n (n is a positive integer greater than or equal to 1) slots are used to support a private line service with a bandwidth of $n \times 10$ Mbps. A plurality of services randomly or evenly occupy 480 slots in a multiframe period. In extreme cases, a single-node latency of a service increases (for example, a single-node latency of a private line service with a bandwidth of 10 Mbps may reach 150 μs), causing an increase of an end-to-end latency of the service. During transmission of a service signal between nodes, a slot number of a slot in which an upstream node sends a service signal is the same as a slot number of a slot in which a current node sends the service signal. However, a phase difference and an internal processing latency may cause missing of a slot in a current multiframe period.

FIG. 11 is still used as an example. When a service signal is sent in a slot 3 on the upstream node 1101, after the receive end of the current node 1102 receives the service signal in the slot 3, the transmit end of the current node 1102 sends the service signal in the slot 3. Due to a phase difference Ts and an internal processing latency Tp of a node P1, the current node 1102 misses a sending occasion in the slot 3. In this case, the current node 1102 needs to wait until a next multiframe period and then send the service signal to the downstream node 1103, that is, a sending latency for the service signal is at least greater than or equal to 50.688 μs.

The three nodes 1101, 1102, and 1103 shown in FIG. 11 may be any three consecutive nodes of the communication device 101, the communication device 101, the intermediate node 110, the intermediate node 111, and the intermediate node 112 shown in FIG. 1. For example, if a service signal flows from the first communication device 101 to the second communication device 102, the upstream node 1101 may be the first communication device 101, the current node 1102 may be the intermediate node 110, and the downstream node 1103 may be the intermediate node 111; or the upstream node 1101 may be the intermediate node 111, the current node may be the intermediate node 112, and the downstream node may be the second communication device 102. If a service signal flows from the second communication device 102 to the first communication device 101, the upstream node 1101 may be the second communication device 102, the current node 1102 may be the intermediate node 112, and the downstream node 1103 may be the intermediate node 111; or the upstream node 1101 may be the intermediate node 111, the current node 1102 may be the intermediate node 110, and the downstream node 1103 may be the first communication device 101.

The following describes embodiments of the present disclosure with reference to FIG. 1. For ease of description, in the following embodiments, it is assumed that a flow direction of a service signal is from the first communication device 101 to the second communication device 102.

Figure 12:
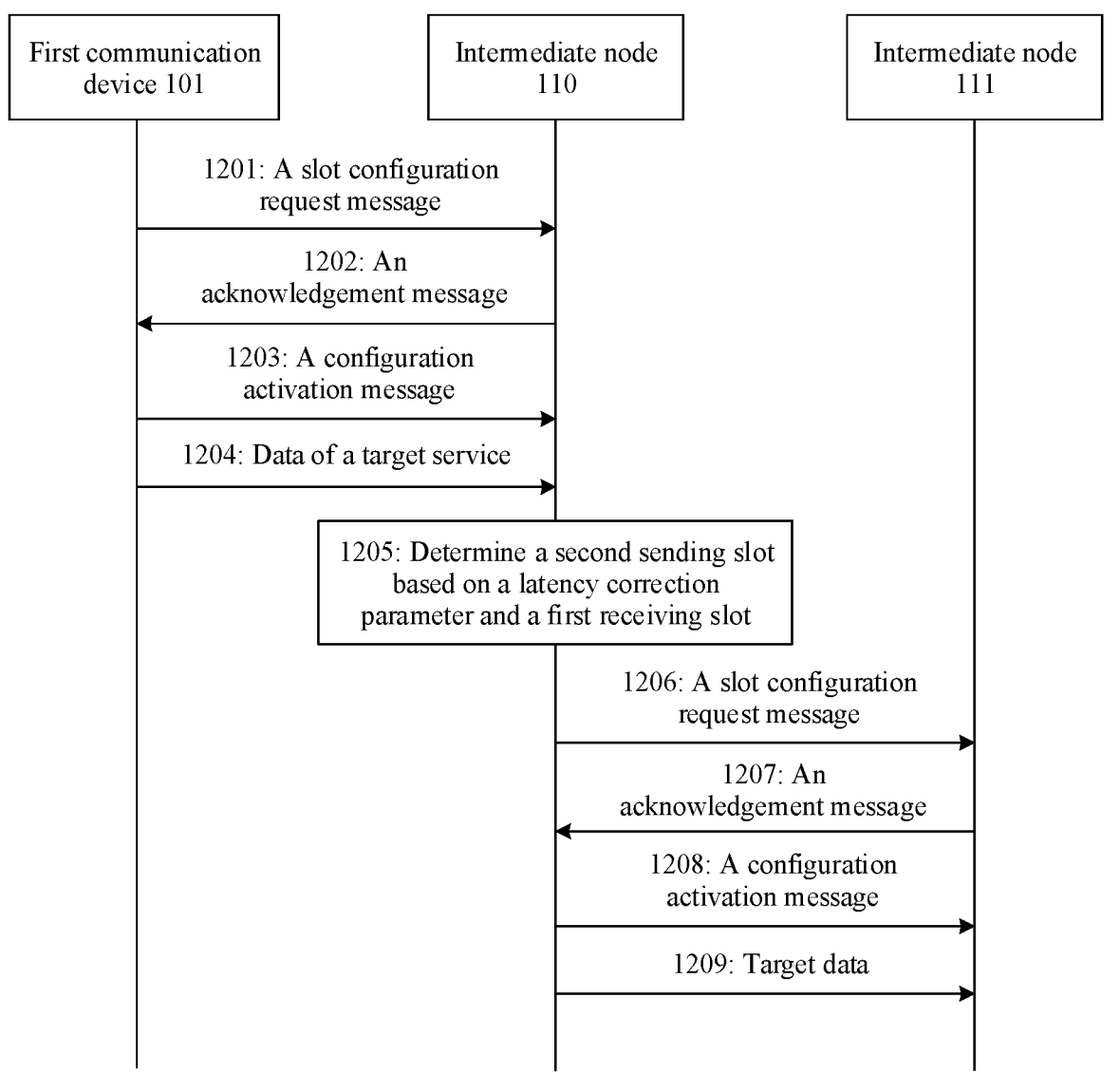
FIG. 12 is a schematic flowchart of a method for determining a transmission slot according to an embodiment of the present disclosure.

FIG. 12 is a schematic flowchart of a method for determining a transmission slot according to an embodiment of the present disclosure.

1201: The first communication device 101 sends a slot configuration request message to the intermediate node 110.

The slot configuration request message may carry an identifier (ID) of a target service and a slot number (fgSlot-Num) of a slot for sending data of the target service. The ID of the target service may also be referred to as a client ID or a fine granularity client ID (fine granularity client ID, fgClientID). For ease of description, the slot used by the first communication device 101 to send the data of the target service may be referred to as a first sending slot.

1202: After receiving the slot configuration request message, the intermediate node 110 sends an acknowledgement (ACK) message to the first communication device 101. The ACK message indicates that the intermediate node 110 successfully receives the slot configuration request message from the first communication device 101. In other words, after receiving the ACK message, the first communication device 101 may determine that the intermediate node 110 successfully receives the slot configuration request message in step 1201.

In some embodiments, the ACK message may also carry the client ID and the slot number of the first sending slot that are carried in the slot configuration request message.

In some other embodiments, the ACK message may alternatively not carry the client ID and the slot number of the first sending slot that are carried in the slot configuration request message.

1203: After receiving the ACK message, the first communication device 101 may send a configuration activation message to the intermediate node 110.

The configuration activation message indicates a slot activation condition.

In some embodiments, the slot activation condition may be predetermined. In other words, if the intermediate node 110 determines that a received message is a configuration activation message, the intermediate node 110 may use, based on an activation condition that is pre-agreed upon, a slot determined for sending the data of the target service. For example, it may be pre-agreed upon that the determined slot is to be used to send the data of the target service in a next multiframe after the configuration activation message is received.

In some other embodiments, the configuration activation message may include a frame number of an effective multiframe. In this case, the intermediate node 110 may determine an activation condition based on the frame number of the multiframe.

The slot configuration request message, the ACK message, and the configuration validation message sent between nodes may carry an operation code (OPCode). Different messages have different operation codes. For example, an OPCode of the slot configuration request message may be 0b0101, an OPCode of the ACK message is 0b0110, and an OPCode of the configuration activation message is 0b111. A node may determine a type of a received message based on an OPCode. For example, if the intermediate node 110 receives a message with an OPCode of 0b111, the intermediate node 110 may determine that the received message is a configuration activation message.

FIG. 13 is a schematic diagram of formats of an OH slot configuration request message, an ACK message, and a configuration activation message of an fgBU.

An OH of the fgBU is located in a 1$^{st}$ data block after an S block, and occupies first 56 bits in total. As shown in FIG. 13, the OH of the fgBU includes the following content:

(1) Reserved bit (Resv): in a bit 0 and a bit 1. The location is reserved for future extension.

(2) Multiframe indication (MFI): in a bit 2 to a bit 7, and indicating a sequence number of the fgBU to which the OH belongs in a multiframe. An MFI field of a 1$^{st}$ fgBU in the multiframe is filled with 0b000000, and MFI values of subsequent fgBUs are sequentially increased by 1. When the fgBU is carried in a 5 Gbps slot of an MTN, a valid value range of the MFI is 0b000000 to 0b010011 (0 to 19). When the fgBU is carried in a coarse granularity 1 Gbps slot, a valid value range of the MFI is 0b000000 to 0b000011 (0 to 3). 0b00101000 to 0b111111 are reserved values.

(3) Type (Flag): in a bit 8 to a bit 9, and indicating a type of a message in a bit 10 to a bit 55. When the flag is 0b00, the bit 10 to the bit 55 carry a slot configuration (calendar configuration) message, and the slot configuration message includes the slot configuration request message, the acknowledgement message, and the configuration activation message. When the flag is 0b11, the bit 10 to the bit 55 carry a management channel (general communication channel, GCC). 0b10 and 0b01 are two reserved types of the flag.

(4) Cyclic redundancy check code (cyclic redundancy check 7, CRC7): A polynomial of the CRC7 is x7+x5+ x4+x2+x+1, and an initial value is 0. A most significant bit of a CRC7 result [x6:x0] is sent first. Only a bit 8 to a bit 48 are checked in the CRC7.

(5) ACK/REQ/CMT: Protocol negotiation and interaction are performed between adjacent nodes. Specific meanings and codes are defined as required.

As shown in FIG. 13, the slot configuration request message, the acknowledgement message, and the configuration activation message are carried in a byte 1 in the OH of the fgBU (fgBU OH Byte 1).

1204: The first communication device 101 sends the data of the target service to the intermediate node 110 in the first sending slot. Correspondingly, the intermediate node 110 receives, in the first receiving slot, the data of the target service that is sent by the first communication device 101. A slot number of a first receiving slot is the same as a slot number of the first sending slot.

1205: The intermediate node 110 determines, based on a latency correction parameter and the first receiving slot, a slot for sending the data of the target service. For ease of description, a slot used by the intermediate node 110 to send the data of the target service may be referred to as a second sending slot.

In some embodiments, the latency correction parameter may include any one or more of a phase difference between a transmit end and a receive end of the intermediate node 110 and an internal latency of the intermediate node 110.

In some embodiments, the intermediate node 110 may determine a reference receiving slot based on the first receiving slot, where the reference receiving slot and the first receiving slot correspond to a same moment.

For example, due to the phase difference between the transmit end and the receive end of the intermediate node 110, a slot number of a slot used at the receive end when the intermediate node 110 receives the data of the target service at a moment T1 is 1, and a slot number of a slot used at the transmit end of the intermediate node 110 at the moment T1 is 5. A slot with a slot number of 1 at the receive end of the intermediate node 110 is the first receiving slot, and a slot with a slot number of 5 at the transmit end of the intermediate node 110 is the reference receiving slot.

The intermediate node 110 may determine a slot based on the phase difference and the internal latency.

For example, the intermediate node 110 may determine a slot based on the following formula:

$$SlotNumOut=(SlotNumberIn+(|Tp|+|Ts|)/Tslot)mod\ NumberAll \quad (Formula\ 1.1),\ where$$

SlotNumOut indicates the slot, SlotNumberIn indicates a slot number of the reference receiving slot, Tp indicates the internal latency of the intermediate node 110, Ts indicates the phase difference between the transmit end and the receive end of the intermediate node 110, Tslot indicates sending time of each slot, NumberAll is a total quantity (for example, 480) of slots included in one fgBU multiframe, and mod indicates a modulo operation.

In some embodiments, the intermediate node 110 performs phase difference alignment in advance. In this case, it can be considered that a direct phase difference between the transmit end and the receive end of the intermediate node

110 may be ignored. In this case, a slot may be determined based on the following formula:

$$SlotNumOut = (SlotNumberIn + |Tp|/Tslot)\ mod\ NumberAll \quad (Formula\ 1.2)$$

Meanings of symbols in the formula 1.2 are the same as those in the formula 1.1. For brevity, details are not described herein again.

For ease of description, the slot determined by the intermediate node 110 based on the formula 1.1 or the formula 1.2 is referred to as a reference slot below.

After determining the reference slot, the intermediate node 110 may send the data of the target service by using one of the following three policies:

Policy 1: The data of the target service is sent by using a $1^{st}$ vacant slot starting from the reference slot.

Policy 2: The data of the target service is sent by using a $1^{st}$ slot, starting from the reference slot, that is not occupied by a preset type.

Policy 3: The data of the target service is sent by using the reference slot.

The following separately describes the policy 1 to the policy 3.

Policy 1: The data of the target service is sent by using a $1^{st}$ vacant slot after the reference slot.

After determining the reference slot, the intermediate node 110 may first determine whether the reference slot is already occupied by another service. If the reference slot is not occupied by another service, the intermediate node 110 may send the data of the target service in the reference slot. In other words, in this case, the reference slot is the same as the second sending slot. If the reference slot is already occupied by another service, the intermediate node 110 may continue to determine whether a next slot (namely, an $(N_{RE}+1)^{th}$ slot, where $N_{RE}$ indicates the reference slot) of the reference slot is already occupied. If the next slot of the reference slot is not occupied, the intermediate node 110 may send the data of the target service in the next slot of the reference slot. If the next slot of the reference slot is occupied, the intermediate node 110 continues to determine whether a next slot (namely, an $(N_{RE}+2)^{th}$ slot) is occupied until a vacant slot is detected, and determines that the vacant slot is the second sending slot.

In other words, after determining the reference slot, the intermediate node 110 may first determine whether the reference slot is occupied; and if the reference slot is not occupied, the intermediate node 110 may send the data of the target service by using the reference slot; or if the reference slot is occupied, the intermediate node 110 may send the data of the target service by using the $1^{st}$ vacant slot after the reference slot.

For example, the reference slot determined by the intermediate node 110 based on the formula 1.1 is a slot 5. The intermediate node 110 may determine whether the slot 5 is already occupied by another service.

Assuming that the slot 5 is not occupied by another service, the intermediate node 110 may send the data of the target service by using the slot 5.

Assuming that the slot 5 is already occupied by another service, the intermediate node 110 may continue to determine whether a slot 6 is already occupied by another service. Assuming that the slot 6 is not occupied by another service, the intermediate node 110 may send the data of the target service by using the slot 6.

Assuming that both the slot 5 and the slot 6 are already occupied by another service, the intermediate node 110 may continue to determine whether a slot 7 is occupied by another service. Assuming that the slot 7 is not occupied by another service, the intermediate node 110 may send the data of the target service by using the slot 7. Assuming that the slot 7 is already occupied by another service, the intermediate node 110 may determine whether a subsequent slot is already occupied until a vacant slot is determined, and use the vacant slot as the second sending slot.

It can be understood that, if the reference slot is a slot 480, the next slot of the reference slot is a slot 1 in a next multiframe.

Policy 2: The data of the target service is sent by using a $1^{st}$ slot, starting from the reference slot, that is not occupied by a preset type.

After determining the reference slot, the intermediate node 110 may first determine whether the reference slot is already occupied by another service. If the reference slot is not occupied by another service, the intermediate node 110 may send the data of the target service in the reference slot. In other words, in this case, the reference slot is the same as the second sending slot. If the reference slot is already occupied by another service, the intermediate node 110 may determine a type of the service occupying the reference slot (which may be referred to as a conflicting service for short), and determine whether the type of the conflicting service is a preset type. If the type of the conflicting service is not the preset type and the target service belongs to the preset type, the intermediate node 110 may occupy the reference slot to send the data of the target service. If both the type of the conflicting service and a type of the target service are the preset type, the intermediate node 110 may continue to determine whether a next slot (namely, an $(N_{RE}+1)^{th}$ slot, where $N_{RE}$ indicates the reference slot) of the reference slot is occupied. If the next slot of the reference slot is not occupied, the intermediate node 110 may send the data of the target service by using the next slot of the reference slot. If the next slot of the reference slot is already occupied but a type of a service occupying the next slot of the reference slot is not the preset type, the intermediate node 110 may send the target service by using the next slot of the reference slot. If the next slot of the reference slot is already occupied and a type of a service occupying the next slot of the reference slot is the preset type, the intermediate node 110 continues to determine whether a subsequent slot is already occupied.

In other words, after determining the reference slot, the intermediate node 110 may first determine whether the reference slot is already occupied; if the reference slot is not occupied, determine that the reference slot is the second sending slot; or if the reference slot is already occupied, determine whether the type of the conflicting service is the preset type; and if the type of the conflicting service is not the preset type, determine that the reference slot is the second sending slot; or if the type of the conflicting service is the preset type, determine that a $1^{st}$ slot, after the reference slot, that is not occupied by the preset type is the sending slot.

The preset type may be preset according to a requirement. For example, the preset type may be any one or more of the following service types: a latency-sensitive service, a high-priority service (for example, a service with a priority greater than a preset priority threshold), a service with high quality of service (for example, a service with a quality of service level greater than a preset quality of service threshold), or a service with a high bandwidth requirement (for example, a service with a bandwidth requirement greater than a preset bandwidth threshold).

It is assumed that the preset type is a latency-sensitive service. Correspondingly, a latency-insensitive service does not belong to the preset type.

For example, the reference slot determined by the intermediate node 110 based on the formula 1.1 is a slot 5. The intermediate node 110 may determine whether the slot 5 is already occupied by another service.

Assuming that the slot 5 is not occupied by another service, the intermediate node 110 may send the data of the target service by using the slot 5.

Assuming that the slot 5 is already occupied by another service, the intermediate node 110 may determine whether a service occupying the slot 5 is a latency-sensitive service. If the service occupying the slot 5 is a latency-insensitive service, the intermediate node 110 may send the data of the target service by using the slot 5. If the service occupying the slot 5 is a latency-sensitive service, the intermediate node 110 may continue to determine whether a slot 6 is occupied by another service. If the slot 6 is not occupied by another service, the intermediate node 110 may send the data of the target service by using the slot 6.

Assuming that both the slot 5 and the slot 6 are occupied by another service and the service occupying the slot 5 and the slot 6 is a latency-sensitive service, the intermediate node 110 may continue to determine whether a slot 7 is occupied by another service. Assuming that the slot 7 is not occupied by another service or a service occupying the slot 7 is a latency-insensitive service, the intermediate node 110 may send the data of the target service by using the slot 7. Assuming that the slot 7 is also already occupied by a latency-sensitive service, the intermediate node 110 may determine whether a subsequent slot is occupied until a slot not occupied by a latency-sensitive service is determined, and use the slot as the second sending slot.

As described above, if the type of the conflicting service is not the preset type, a slot in which the conflicting service is located may be used by the intermediate node 110 to send the data of the target service. The intermediate node 110 may process the conflicting service according to a preset rule.

In some embodiments, for a conflicting service, the intermediate node 110 may determine a next vacant slot, and send the conflicting service by using the next vacant slot.

For example, assuming that the reference slot determined by the intermediate node 110 based on the formula 1.1 is a slot 5 and a service occupying the slot 5 is a latency-insensitive service, the intermediate node 110 may send the data of the target service by using the slot 5. The intermediate node 110 may determine whether a slot 6 is occupied. If the slot 6 is not occupied, the intermediate node 110 may send, by using the slot 6, the latency-insensitive service that originally occupies the slot 5. If the slot 6 is also occupied, the intermediate node 110 may continue to determine whether a slot 7 is occupied, and so on.

In some other embodiments, for a conflicting service, the intermediate node 110 may send the conflicting service by using a same slot in a next multiframe.

For example, assuming that the reference slot determined by the intermediate node 110 based on the formula 1.1 is a slot 5 and a service occupying the slot 5 is a latency-insensitive service, the intermediate node 110 may send the data of the target service by using the slot 5, and the intermediate node 110 may send, by using a slot 5 in a next multiframe, the latency-insensitive service that originally occupies the slot 5 in a current multiframe.

In some other embodiments, for a conflicting service, the intermediate node 110 may determine, based on a service type of the conflicting service, how to process the conflicting service.

For example, it is assumed that service priorities include a total of eight priorities: a priority 0 to a priority 7, where the priority 0 is a highest priority, and the priority 7 is a lowest priority. It is assumed that a service corresponding to a priority less than 2 (including services corresponding to the priority 0, the priority 1, and the priority 2) is a high-priority service, a service corresponding to the priority 7 is a low-priority service, and a service corresponding to a priority greater than 2 and less than 7 (including services corresponding to the priority 3, the priority 4, the priority 5, and the priority 6) is a medium-priority service. Assuming that the reference slot determined by the intermediate node 110 based on the formula 1.1 is a slot 5, a service occupying the slot 5 is a medium-priority service, and the target service is a high-priority service, the intermediate node 110 may send the data of the target service by using the slot 5, and the intermediate node 110 may determine a vacant slot after the slot 5 for sending the medium-priority service that originally occupies the slot 5. Assuming that the reference slot determined by the intermediate node 110 based on the formula 1.1 is a slot 5, a service occupying the slot 5 is a low-priority service, and the data of the target service is a high-priority service, the intermediate node 110 may send the data of the target service by using the slot 5, and the intermediate node 110 may send, by using a slot 5 in a next multiframe, the low-priority service that originally occupies the slot 5 in a current multiframe.

For another example, it is assumed that quality of service levels include a total of eight levels: a level 0 to a level 7, where the level 0 is a highest quality of service level, and the level 7 is a lowest quality of service level. It is assumed that a service corresponding to a level less than 2 (including services corresponding to the level 0, the level 1, and the level 2) is a service with high quality of service, a service corresponding to a level greater than 7 (including services corresponding to the level 7 and the level 8) is a service with a low quality of service level, and a service corresponding to a level greater than 2 and less than 7 (including services corresponding to the level 3, the level 4, the level 5, and the level 6) is a service with a medium quality of service level. The intermediate node 110 may determine a level of the data of the target service based on a quality of service level and a service priority. For example, the intermediate node 110 may determine the level of the data of the target service based on Table 1.

TABLE 1

| Level | Quality of service level | Priority |
|---|---|---|
| 1 | Less than or equal to 2 | Less than or equal to 2 |
| 2 | Greater than 2 and less than 7 | Less than or equal to 2 |
| 3 | Greater than 2 and less than 7 | Greater than 2 and less than 7 |
| 4 | Greater than or equal to 7 | Greater than 2 and less than 7 |
| 5 | Greater than or equal to 7 | Greater than or equal to 7 |

If a service level of the conflicting service is higher than a service level of the data of the target service, the target service may directly occupy a slot occupied by the conflicting service. For example, assuming that the reference slot determined by the intermediate node 110 based on the formula 1.1 is a slot 5, a service level of a service occupying the slot 5 is 3, and the service level of the data of the target service is 1 or 2, the intermediate node 110 may send the data of the target service by using the slot 5. For another example, assuming that the reference slot determined by the intermediate node 110 based on the formula 1.1 is a slot 5, a service level of a service occupying the slot 5 is 5, and the service level of the data of the target service is less than or equal to 4, the intermediate node 110 may send the data of the target service by using the slot 5.

The conflicting service may be processed in the following several manners: If the service level of the conflicting service is 2 or 3, a next vacant slot may be determined for sending the conflicting service. If the service level of the conflicting service is 4, the conflicting service may be sent by using a same slot in a next multiframe. If the service level of the conflicting service is 5, the conflicting service may be discarded.

Policy 3: The data of the target service is sent by using the reference slot.

After determining the reference slot, the intermediate node 110 may directly send the second sending slot by using the reference slot. In other words, in this case, the intermediate node 110 does not need to first determine whether the reference slot is already occupied by another service or whether a service occupying the reference slot belongs to a preset type. If the reference slot is already occupied by another service, the intermediate node 110 may process, with reference to the manner of processing the conflicting service in the policy 2, the service occupying the reference slot.

In some other embodiments, the latency correction parameter may be preset duration. In this case, the intermediate node 110 may determine a first reference moment and a second reference moment, and determine the second sending slot based on the preset duration and a difference between the first reference moment and the second reference moment.

The intermediate node 110 may determine the first reference moment based on the first sending slot.

The first reference moment may be a start moment, an intermediate moment, or an end moment of the first sending slot.

The intermediate node 110 determines a $1^{st}$ available slot after the first reference moment, and determines the second reference moment based on the slot. For ease of description, the $1^{st}$ available slot after the first reference moment is referred to as a candidate slot 1, a $2^{nd}$ available slot after the first reference moment is referred to as a candidate slot 2, a $3^{rd}$ available slot after the first reference moment is referred to as a candidate slot 3, and so on.

An available slot includes a vacant slot. In addition, if a type of the target service is a preset type, the available slot may further include a slot occupied by a service that does not belong to the preset type.

The second reference moment corresponds to the first reference moment. For example, if the first reference moment is the start moment of the first sending slot, the second reference moment is a start moment of the candidate slot 1; if the first reference moment is the intermediate moment of the first sending slot, the second reference moment is also an intermediate moment of the candidate slot 1; or if the first reference moment is the end moment of the first sending slot, the second reference moment is also an end moment of the candidate slot 1.

The preset duration may be configured by an administrator.

If the difference between the second reference moment and the first reference moment is greater than the preset duration, it may be determined that the vacant slot 1 is the second sending slot. If the difference between the second reference moment and the first reference moment is not greater than the preset duration, a third reference moment is determined based on the candidate slot 2, and the second sending slot is further determined based on the preset duration and a difference between the third reference moment and the first reference moment.

Similarly, the third reference moment also corresponds to the first reference moment (to be specific, if the first reference moment is the start moment of the first sending slot, the third reference moment is a start moment of the candidate slot 2; if the first reference moment is the intermediate moment of the first sending slot, the third reference moment is also an intermediate moment of the candidate slot 2; or if the first reference moment is the end moment of the first sending slot, the third reference moment is also an end moment of the candidate slot 2). A manner of determining the second sending slot based on the preset duration and the difference between the third reference moment and the first reference moment is the same as the manner of determining the second sending moment based on the preset duration and the difference between the second reference moment and the first reference moment. To be specific, if the difference between the third reference moment and the first reference moment is greater than the preset duration, it may be determined that the candidate slot 2 is the second sending slot; or if the difference between the third reference moment and the first reference moment is not greater than the preset duration, a fourth reference moment is determined based on the candidate slot 3, and the second sending slot is further determined based on the preset duration and a difference between the fourth reference moment and the first reference moment.

In the foregoing embodiment, the second sending slot is determined by comparing the difference between the second reference moment and the first reference moment with the preset duration. In some other embodiments, the second sending slot is determined by comparing the second reference moment with a sum of the first reference moment and the preset duration. For example, whether the second reference moment is greater than the sum of the first reference moment and the preset duration is determined. If the second reference moment is greater than the sum of the first reference moment and the preset duration, it may be determined that the candidate slot 1 is the second sending slot. Otherwise, the third reference moment is further determined, and whether the candidate slot 2 may be used as the second sending slot is determined based on the third reference moment, the first reference moment, and the preset duration.

In some other embodiments, the latency correction parameter may be sending time of each slot. In this case, the intermediate node 110 records a moment at which the data of the target service is received, first sends the received data of the target service to the intermediate node 111 based on an original configuration, and records a moment at which the transmit end sends the data of the target service. Then the intermediate node may determine a slot based on the following formula:

$$RefSlot = \left(SlotNumber + \left\lceil \frac{Tout - Tin}{Tslot} \right\rceil \right) \bmod NumberAll, \quad \text{Formula 1.3}$$

where

RefSlot may be referred to as a reference slot, SlotNumber is a slot number of the first receiving slot, Tout is the moment at which the intermediate node 110 sends the data of the target service, Tin is the moment at which the intermediate node 110 receives the data of the target service, Tslot is sending time of each time sequence, mod indicates a modulo operation, and NumberAll indicates a total quantity (for example, 480) of slots included in one fgBU multiframe.

After determining a reference slot based on the formula 1.3, the intermediate node 110 may determine the second sending moment based on the reference moment. A manner of determining, by the intermediate node, the second sending moment based on the reference moment is the same as that in the foregoing embodiment. For brevity, details are not described herein again.

1206: The intermediate node 110 sends a slot configuration request message to the intermediate node 111.

The slot configuration request message may carry the ID of the target service and a slot number of the second sending slot (namely, the slot determined in step 1205).

1207: After receiving the slot configuration request message, the intermediate node 111 sends an ACK message to the intermediate node 110.

1208: After receiving the ACK message, the intermediate node 110 may send a configuration activation message to the intermediate node 111.

1209: The intermediate node 110 sends the data of the target service to the intermediate node 111 in the second sending slot.

Specific implementations of step 1206 to step 1209 are similar to those of step 1201 to step 1204. For brevity, details are not described herein again.

Alternatively, the intermediate node 111 may determine, based on the latency correction parameter and a second receiving slot, a slot for sending the data of the target service, where the second receiving slot is a slot used by the intermediate node 111 to receive the data of the target service that is sent by the intermediate node 110 in the second sending slot. In other words, a slot number of the second receiving slot is the same as the slot number of the second sending slot. An implementation of determining, by the intermediate node 111, the slot for sending the data of the target service is the same as the manner of determining the second sending slot by the intermediate node 110. For brevity, details are not described herein again.

A process of determining a sending slot by the intermediate node 112 and the second communication device 102 is similar to the process of determining the sending slot by the intermediate node 110. For brevity, details are not described herein again.

Figure 14:
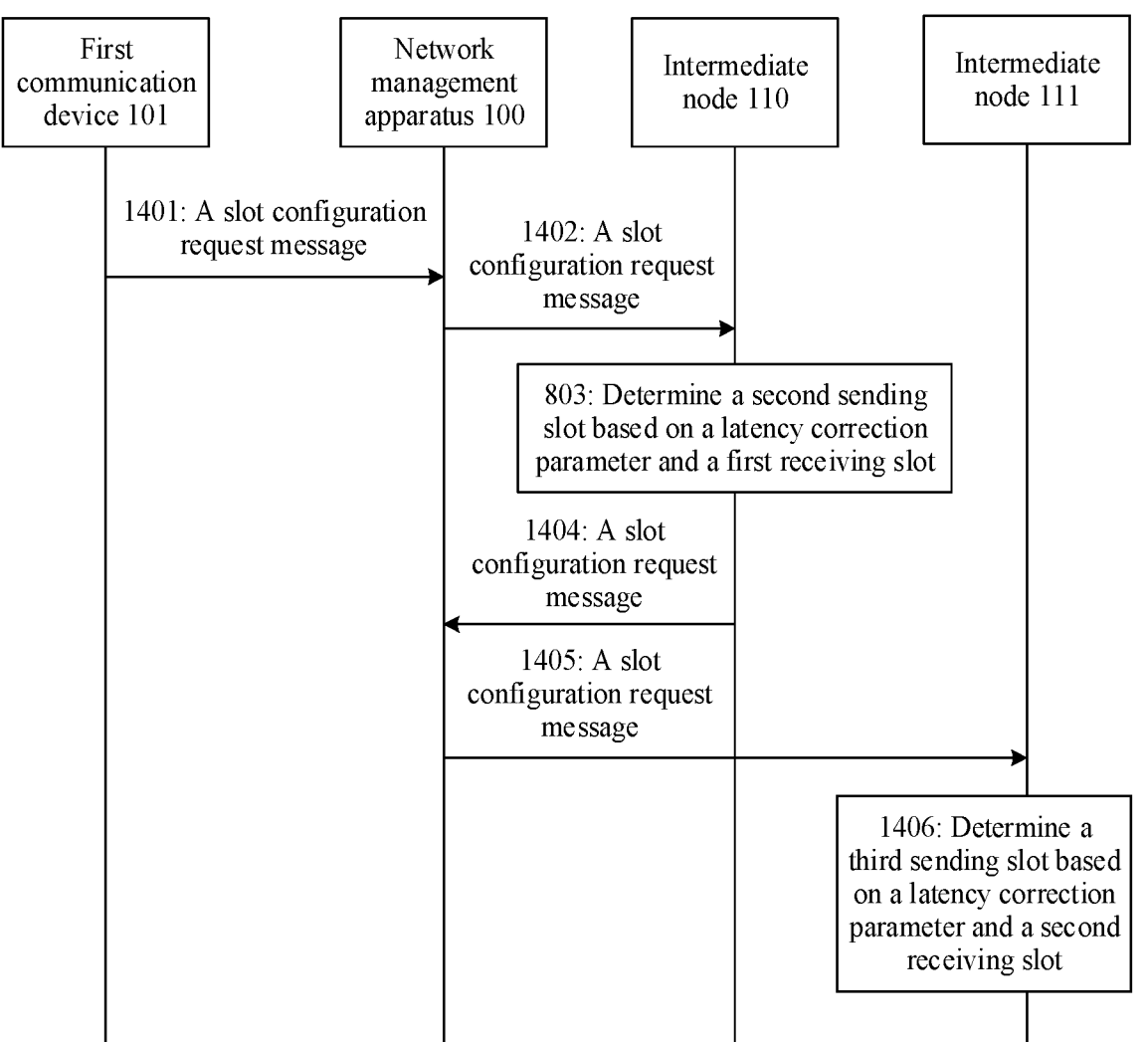
FIG. 14 is a schematic flowchart of another method for determining a transmission slot according to an embodiment of the present disclosure.

FIG. 14 is a schematic flowchart of another method for determining a transmission slot according to an embodiment of the present disclosure.

1401: The first communication device 101 sends a slot configuration request message to the network management apparatus 100. Correspondingly, the network management apparatus 100 receives the slot configuration request message from the first communication device 101.

The slot configuration request message may carry an ID of a target service and a slot number of a slot used by the first communication device 101 to send data of the target service. The ID of the target service may also be referred to as a client ID or a fine granularity client ID (fgClientID). For ease of description, the slot used by the first communication device 101 to send the data of the target service may be referred to as a first sending slot.

1402: The network management apparatus 100 sends the slot configuration request message received in step 1401 to the intermediate node 110. Correspondingly, the intermediate node 110 receives the slot configuration request message from a gateway device 504.

1403: The intermediate node 110 determines, based on a latency correction parameter and the first receiving slot, a slot for sending the data of the target service. A slot number of the first receiving slot is the same as a slot number of the first sending slot, and the first sending slot is a slot used by the first communication device 101 to send the data of the target service. For ease of description, a slot used by the intermediate node 110 to send the data of the target service may be referred to as a second sending slot.

A specific manner of determining the second sending slot by the intermediate node 110 is the same as the specific manner of determining the second sending slot by the intermediate node 110 in the embodiment shown in FIG. 12. For brevity, details are not described herein again.

1404: The intermediate node 110 sends a slot configuration request message to the network management apparatus 100.

The slot configuration request message may carry the ID of the target service and a slot number of the second sending slot (namely, the slot determined in step 1403).

1405: The network management apparatus 100 sends the slot configuration request message received in step 1404 to the intermediate node 111.

1406: The intermediate node 111 determines, based on a second receiving slot and a latency correction parameter of the intermediate node 111, a slot (which may be referred to as a third sending slot) used by the intermediate node 111 to send the data of the target service. The second receiving slot is a slot used by the intermediate node 111 to receive the data of the target service that is sent by the intermediate node 110 in the second sending slot. In other words, a slot number of the second receiving slot is the same as the slot number of the second sending slot.

An implementation of determining the third sending slot by the intermediate node 111 is the same as the manner of determining the second sending slot by the intermediate node 110. For brevity, details are not described herein again.

In the method shown in FIG. 14, after all nodes in a network determine sending slots, normal service transmission may be started. To be specific, transmission of the data of the target service starts. For example, assuming that a transmission path for the data of the target service includes only three nodes (the first communication device 101, the intermediate node 110, and the intermediate node 111) shown in FIG. 5 and the first communication device 101 is a start node, the first communication device 101 may start to send the data of the target service to the intermediate node 110 after the intermediate node 111 determines a sending slot.

FIG. 15 is a schematic flowchart of another method for determining a transmission slot according to an embodiment of the present disclosure. In the embodiment shown in FIG. 15, it is assumed that the first communication device 101 is a start node of a service corresponding to data of a target service.

1501: The network management apparatus 100 sends slot configuration information to the first communication device 101, where the slot configuration information includes a slot number of a slot for sending the data of the target service. Similarly, a slot used by the first communication device 101 to send the data of the target service may be referred to as a first sending slot. The slot configuration information may further carry a client ID of the data of the target service.

The network management apparatus 100 may determine the first sending slot based on a slot occupation status. For example, the network management apparatus 100 may determine any slot from a plurality of vacant slots (to be specific, slots that are not occupied by another service) as the first sending slot.

Optionally, the first communication device 101 may send an ACK message to a node 504 after receiving the slot configuration information. The ACK message indicates that the first communication device 101 successfully receives the slot configuration information from the network management apparatus 100.

1502: The network management apparatus 100 obtains a latency correction parameter of the intermediate node 110 and a latency correction parameter of the intermediate node 111.

Optionally, in some embodiments, the latency correction parameter of the intermediate node 110 may include any one or more of a phase difference between a transmit end and a receive end of the intermediate node 110 and an internal latency of the intermediate node 110; and the latency correction parameter of the intermediate node 111 includes any one or more of a phase difference between a transmit end and a receive end of the intermediate node 111 and an internal latency of the intermediate node 111. In some embodiments, the intermediate node 110 and the intermediate node 111 may periodically report the latency correction parameters to the network management apparatus 100. In some other embodiments, the network management apparatus 100 may alternatively test the latency correction parameters of the intermediate node 110 and the intermediate node 111 by using test data.

Optionally, in some other embodiments, the latency correction parameter of the intermediate node 110 may be preset duration (referred to as preset duration 1), and the latency correction parameter of the intermediate node 111 may also be preset duration (referred to as preset duration 2). The preset duration 1 and the preset duration 2 may be set by an administrator and prestored on the network management apparatus 100.

1503: The network management apparatus 100 determines, based on a first receiving slot and the latency correction parameter of the intermediate node 110, a slot (which may be referred to as a second sending slot) used by the intermediate node 110 to send the data of the target service.

A meaning of the first receiving slot and a specific manner of determining the second sending slot by the network management apparatus 100 are the same as the specific manner of determining the second sending slot by the intermediate node 110 in the embodiment shown in FIG. 12. For brevity, details are not described herein again.

1504: The network management apparatus 100 indicates a slot number of the second sending slot to the intermediate node 110.

For example, the network management apparatus 100 may send slot configuration information to the intermediate node 110, where the slot configuration information may include the client ID and the slot number of the second sending slot.

Optionally, the intermediate node 110 may send an ACK message to the node 504 after receiving the slot configuration information. The ACK message indicates that the intermediate node 110 successfully receives the slot configuration information from the network management apparatus 100.

1505: The network management apparatus 100 determines, based on a second receiving slot and the latency correction parameter of the intermediate node 111, a slot (which may be referred to as a third sending slot) used by the intermediate node 111 to send the data of the target service.

An implementation of determining the third sending slot by the network management apparatus 100 is the same as the manner of determining the second sending slot by the network management apparatus 100. For brevity, details are not described herein again.

1506: The network management apparatus 100 sends a slot number of the third sending slot to the intermediate node 111.

For example, the network management apparatus 100 may send slot configuration information to the intermediate node 111, where the slot configuration information may include the client ID and the slot number of the third sending slot.

Optionally, the intermediate node 111 may send an ACK message to the node 504 after receiving the slot configuration information. The ACK message indicates that the intermediate node 111 successfully receives the slot configuration information from the network management apparatus 100.

In the foregoing embodiment, in a process of determining a sending slot of a node, a receiving slot of the node is first determined, and then the sending slot of the node is determined based on the receiving slot of the node.

In some other embodiments, a receiving slot of a node may alternatively be determined based on a sending slot of the node.

For example, the intermediate node 111 may determine, based on a slot in which the intermediate node 111 sends the data of the target service and the latency correction parameter of the intermediate node 111, a slot in which the intermediate node 111 receives the data of the target service. For ease of description, the slot in which the intermediate node 111 sends the data of the target service may be referred to as the first sending slot, and the slot in which the intermediate node 111 receives the data of the target service may be referred to as the first receiving slot.

In some embodiments, the intermediate node 111 may determine the slot based on the following formula:

$$SlotNumOut =\qquad\qquad\qquad\qquad\text{(Formula 2.1)}$$
$$\left(SlotNumberIn + NumberAll - (|Tp|) + |Ts|/Tslot\right)$$
$$\text{mod } NumberAll$$

where

SlotNumOut indicates the slot, SlotNumberIn indicates a slot number of a reference receiving slot, and meanings of Tp, Ts, Tslot, NumberAll, and mod are the same as those in the formula 1.1. For brevity, details are not described herein again.

The reference receiving slot and the first sending slot correspond to a same moment. The reference receiving slot may be determined based on the first sending slot.

For example, due to the phase difference between the transmit end and the receive end of the intermediate node 111, a slot number of a slot used at the transmit end when the intermediate node 111 sends the data of the target service at a moment T2 is 5, and a slot number of a slot used at the receive end of the intermediate node 111 at the moment T2 is 1. A slot with a slot number of 1 at the receive end of the intermediate node 111 is the reference receiving slot, and a slot with a slot number of 5 at the transmit end of the intermediate node 110 is the first sending slot.

Similarly, the intermediate node 111 may also perform phase difference alignment in advance. In this case, it can be considered that a direct phase difference between the transmit end and the receive end of the intermediate node 111 may be ignored. In this case, a slot may be determined based on the following formula:

$$SlotNumOut =\qquad\qquad\qquad\qquad\text{(Formula 2.2)}$$
$$\left(SlotNumberIn + NumberAll - (|Tp|)/Tslot\right) \text{ mod } NumberAll$$

Meanings of symbols in the formula 2.2 are the same as those in the formula 2.1. For brevity, details are not described herein again.

In some other embodiments, the latency correction parameter may be sending time of each slot. In this case, the intermediate node 111 records a moment at which the data of the target service is received, first sends the received data of the target service to the intermediate node 112 based on an original configuration, and records a moment at which the transmit end sends the data of the target service. Then the intermediate node may determine a slot based on the following formula:

$$RefSlot = \left(SlotNumber + \left\lceil \frac{Tout - Tin}{Tslot} \right\rceil\right) \text{mod } NumberAll, \qquad \text{Formula 2.3}$$

where

RefSlot may be referred to as a reference slot, SlotNumber is a slot number of the first sending slot, Tout is the moment at which the intermediate node 111 sends the data of the target service, Tin is the moment at which the intermediate node 111 receives the data of the target service, Tslot is sending time of each time sequence, mod indicates a modulo operation, and NumberAll indicates a total quantity (for example, 480) of slots included in one fgBU multiframe.

Similar to the embodiment shown in FIG. 12, the slot determined by the intermediate node 111 based on the formula 2.1, the formula 2.2, or the formula 2.3 may be referred to as a reference slot. Similar to the method shown in FIG. 12, the intermediate node 111 may also determine the first receiving slot according to one of the policy 1, the policy 2, or the policy 3 in the method shown in FIG. 12. A specific determining method is similar to the method shown in FIG. 12. For brevity, details are not described herein again.

In some other embodiments, the latency correction parameter of the intermediate node 111 may also be preset duration. For a specific implementation of determining, by the intermediate node 111, the first receiving slot based on the preset duration, refer to the descriptions in the method shown in FIG. 12. For brevity, details are not described herein again.

After determining the first receiving slot, the intermediate node 111 may indicate the determined first receiving slot to the intermediate node 110 by using a slot configuration request message. Similarly, the slot configuration request message may also carry the ID of the target service. After receiving the slot configuration request message, the intermediate node 110 may send an ACK message to the intermediate node 111. After receiving the ACK message, the intermediate node 111 may send a configuration activation message to the intermediate node 110. For specific content and functions of the slot configuration request message, the ACK message, and the configuration activation message, refer to the descriptions in the method in FIG. 12. For brevity, details are not described herein again.

Similarly, during determining of a receiving slot of a node 5 based on a sending slot of the node, a slot configuration request message may alternatively be forwarded to an upstream device through the network management apparatus. For example, after determining the first receiving slot, the intermediate node 111 may send a slot configuration request message to the network management apparatus 100, and the network management apparatus 100 forwards the slot configuration request message to the intermediate node 110.

In some other embodiments, the network management apparatus may alternatively determine a sending slot of a node based on a receiving slot of the node. For example, the network management apparatus 100 may first determine a sending slot (referred to as a first sending slot) used by the intermediate node 111 to send the data of the target service; then determine, based on the first sending slot and the latency correction parameter of the intermediate node 111, a receiving slot (referred to as a first receiving slot) used by the intermediate node 111 to receive the data of the target service; and finally determine, based on a second sending slot and the latency correction parameter of the intermediate node 110, a sending slot (referred to as a second receiving slot) used by the intermediate node 110 to receive the data of the target service, where data of the target service that is sent by the intermediate node 110 by using the second sending slot is the data of the target service that is received by the intermediate node 111 by using the first receiving slot (in other words, slot numbers of the second sending slot and the second receiving slot are the same). The network management apparatus 100 sends the first sending slot to the intermediate node 111, sends the first receiving slot to the intermediate node 110, and sends the second receiving slot to the first communication device 101. A specific implementation of determining the first receiving slot and the second receiving slot by the network management apparatus 100 is similar to the specific implementation of determining the second sending slot and the third sending slot by the intermediate node 111. For brevity, details are not described herein again.

In addition, for a manner of obtaining the latency correction parameter of the intermediate node 110 and the latency correction parameter of the intermediate node 111 by the network management apparatus 100, and a manner of indicating the first sending slot, the first receiving slot, and the second receiving slot, refer to the embodiment shown in FIG. 15. For brevity, details are not described herein again.

FIG. 16 is a schematic flowchart of a method for determining a transmission slot according to an embodiment of the present disclosure.

1601: A target device obtains a first slot.

1602: The target device determines a second slot based on a latency correction parameter and the first slot, where a first network device includes a receive PHY device and a send PHY device, the receive PHY device includes N slots, the send PHY device includes M slots, the first slot is one of the N slots and the second slot is one of the M slots, or the first slot is one of the M slots and the second slot is one of the N slots, and M and N are positive integers greater than or equal to 1.

In the foregoing technical solution, a sending slot used by the first network device to send data of a target service may be determined by using the latency correction parameter and a receiving slot in which the first network device receives the data of the target service; or a receiving slot for receiving data of a target service may be determined by using the latency correction parameter and a sending slot in which the first network device sends the data of the target service. The sending slot or the receiving slot may be flexibly adjusted by selecting a proper latency correction parameter.

In some embodiments, the N slots and the M slots may be coarse granularity slots.

In some other embodiments, the N slots and the M slots may be fine granularity slots. In this case, the receive PHY device includes P coarse granularity slots, one or more of the P coarse granularity slots include the N slots, the send PHY device includes Q coarse granularity slots, and one or more of the Q coarse granularity slots include the M slots.

In some embodiments, the latency correction parameter includes any one or more of a phase difference between a transmit end and a receive end of the first network device and an internal latency of the first network device. Due to the phase difference between the transmit end and the receive end of the first network device and the internal latency of the first network device, the first network device may need to wait for an excessive amount of time before the first network device can send received data. In the latency correction parameter in the foregoing solution, a time factor (to be specific, the phase difference between the transmit end and the receive end of the first network device and the internal latency of the first network device) that affects data sending by the first network device is considered, and a sending slot or a receiving slot of the first network device is determined based on the time factor. In this way, the first network device can send received data as soon as possible, to reduce a latency.

In some embodiments, that the target device determines a second slot based on a latency correction parameter and the first slot includes: The target device determines a first reference slot based on the first slot and the latency correction parameter; and the target device determines the second slot based on the first reference slot.

In some embodiments, when the first slot is one of the N slots and the second slot is one of the M slots, that the target device determines a first reference slot based on the first slot and the latency correction parameter includes: The target device determines a third slot based on the first slot, where the first slot and the third slot correspond to a same moment, and the third slot is a slot included in the send PHY device; and the target device determines the first reference slot based on the following formula:

$$SlotNumOut = (SlotNumberIn + (|Tp| + ||Ts|)/Tslot) \bmod NumberAll,$$

where

SlotNumOut indicates the first reference slot, SlotNumberIn indicates a slot number of the third slot, Tp indicates the internal latency of the first network device, Ts indicates the phase difference between the transmit end and the receive end of the first network device, Tslot indicates sending time of each slot, NumberAll is a value of M in the M slots, and mod indicates a modulo operation.

In some embodiments, when the first slot is one of the M slots and the second slot is one of the N slots, that the target device determines a first reference slot based on the first slot and the latency correction parameter includes: The target device determines a fourth slot based on the first slot, where the first slot and the fourth slot correspond to a same moment, and the fourth slot is a slot included in the receive PHY device; and the target device determines the first reference slot based on the following formula: SlotNumOut=(SlotNumberIn+NumberAll−(|Tp|+|Ts|)/Tslot) mod NumberAll, where SlotNumOut indicates the first reference slot, SlotNumberIn indicates a slot number of the fourth slot, Tp indicates the internal latency of the first network device, Ts indicates the phase difference between the transmit end and the receive end of the first network device, Tslot indicates sending time of each slot, NumberAll is a value of M in the M slots, and mod indicates a modulo operation.

In some embodiments, that the target device determines the second slot based on the first reference slot includes: determining whether the first reference slot is occupied; and if the first reference slot is not occupied, determining that the first reference slot is the second slot; or if the first reference slot is occupied, determining that a $1^{st}$ vacant slot after the first reference slot is the second slot.

In the foregoing technical solution, it may be determined that a vacant slot closest to the first reference slot is the second slot, so that the first network device can send data without waiting until a slot with a same slot number as that of a receiving slot. This can reduce a sending latency.

In some embodiments, when a type of a service occupying the first slot is a preset type, that the target device determines the second slot based on the first reference slot includes: determining whether the first reference slot is occupied; if the first reference slot is not occupied, determining that the first reference slot is the second slot; or if the first reference slot is already occupied, determining whether a type of a conflicting service is the preset type, where the conflicting service is a service occupying the first reference slot; and if the type of the conflicting service is not the preset type, determining that the first reference slot is the second slot; or if the type of the conflicting service is the preset type, determining that a $1^{st}$ slot, after the first reference slot, that is not occupied by the preset type is the second slot.

In the foregoing technical solution, a slot occupied by another service may be preempted based on a service type. This can further reduce a sending latency.

In some embodiments, the method further includes: when the first reference slot is already occupied by the conflicting service and the type of the conflicting service is not the preset type, determining that a $1^{st}$ available slot after the first reference slot is a slot for sending the conflicting service.

In some embodiments, the target device is a network management apparatus for the first network device; or the target device is the first network device.

In some embodiments, when the first slot is one of the N slots and the second slot is one of the M slots, that a target device obtains a first slot includes: The target device receives a slot configuration request message, where the slot configuration request message includes an identifier of the service occupying the first slot and a slot number of the first slot.

In some embodiments, that the target device receives a slot configuration request message includes: The target device receives the slot configuration request message from a second network device, where the second network device is an upstream device of the first network device; and before the target device determines the second slot based on the latency correction parameter and the first slot, the method further includes: The target device sends an ACK message to the second network device, where the ACK message indicates that the target device successfully receives the slot configuration request message; and the target device receives a configuration activation message from the second network device, where the configuration activation message indicates an activation condition for the second slot.

In some embodiments, the latency correction parameter is preset duration, and that the target device determines a second slot based on a latency correction parameter and the first slot includes: determining a first reference moment based on the first slot; determining a second reference moment based on a $1^{st}$ available slot after the first reference moment; and determining the second slot based on the first reference moment, the second reference moment, and the preset duration.

In the foregoing technical solution, the preset duration may be configured according to a requirement, so that an administrator can configure a sending slot or a receiving slot of a network device.

In some embodiments, the determining the second slot based on the first reference moment, the second reference moment, and the preset duration includes: determining whether a difference between the second reference moment and the first reference moment is greater than the preset duration; and if the difference between the second reference moment and the first reference moment is greater than the preset duration, determining that a $1^{st}$ vacant slot after the first reference moment is the second slot; or if the difference between the second reference moment and the first reference moment is not greater than the preset duration, determining whether a difference between a third reference moment and the first reference moment is greater than the preset threshold, and determining the second slot based on a determining result, where the third reference moment is a moment of a $1^{st}$ available slot after the second reference moment.

In some embodiments, the latency correction parameter is sending time of each slot, and that the target device determines a second slot based on a latency correction parameter and the first slot includes: determining a difference between a third reference moment and a fourth reference moment, where the third reference moment is a moment at which the first network device receives data of a service occupying the first slot, and the fourth reference moment is a moment at which the first network device sends the data of the service occupying the first slot; and determining the second slot based on the difference between the fourth reference moment and the third reference moment, a slot number of the first slot, and the sending time of each slot.

Figure 17:
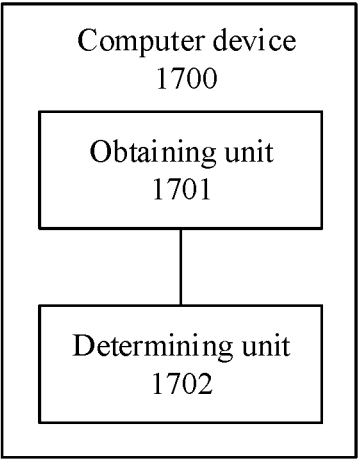
FIG. 17 is a schematic block diagram of a structure of a computer device according to an embodiment of the present disclosure.

FIG. 17 is a schematic block diagram of a structure of a computer device according to an embodiment of the present disclosure. The computer device 1700 shown in FIG. 17 includes an obtaining unit 1701 and a determining unit 1702.

The obtaining unit 1701 is configured to obtain a first slot.

The determining unit 1702 is configured to determine a second slot based on a latency correction parameter and the first slot, where a first network device includes a receive PHY device and a send PHY device, the receive PHY device includes N slots, the send PHY device includes M slots, the first slot is one of the N slots and the second slot is one of the M slots, or the first slot is one of the M slots and the second slot is one of the N slots, and M and N are positive integers greater than or equal to 1.

In some embodiments, the N slots and the M slots may be coarse granularity slots.

In some other embodiments, the N slots and the M slots may be fine granularity slots.

In some embodiments, the receive PHY device includes P coarse granularity slots, one or more of the P coarse granularity slots include the N slots, the send PHY device includes Q coarse granularity slots, and one or more of the Q coarse granularity slots include the M slots.

In some embodiments, the latency correction parameter includes any one or more of a phase difference between a transmit end and a receive end of the first network device and an internal latency of the first network device.

In some embodiments, the determining unit 1702 is specifically configured to: determine a first reference slot based on the first slot and the latency correction parameter; and determine, by the target device, the second slot based on the first reference slot.

In some embodiments, when the first slot is one of the N slots and the second slot is one of the M slots, the determining unit 1702 is specifically configured to: determine a third slot based on the first slot, where the first slot and the third slot correspond to a same moment, and the third slot is a slot included in the send PHY device; and determine the first reference slot based on the following formula:

$$SlotNumOut = (SlotNumberIn + (|Tp| + ||Ts|)/Tslot) \bmod NumberAll,$$

where

SlotNumOut indicates the first reference slot, SlotNumberIn indicates a slot number of the third slot, Tp indicates the internal latency of the first network device, Ts indicates the phase difference between the transmit end and the receive end of the first network device, Tslot indicates sending time of each slot, NumberAll is a value of M in the M slots, and mod indicates a modulo operation.

In some embodiments, when the first slot is one of the M slots and the second slot is one of the N slots, the determining unit 1702 is specifically configured to: determine a fourth slot based on the first slot, where the first slot and the fourth slot correspond to a same moment, and the fourth slot is a slot included in the receive PHY device; and determine the first reference slot based on the following formula:

$$SlotNumOut=(SlotNumberIn+NumberAll-(|Tp|+|Ts|)/Tslot)\bmod NumberAll, \text{ where}$$

SlotNumOut indicates the first reference slot, SlotNumberIn indicates a slot number of the fourth slot, Tp indicates the internal latency of the first network device, Ts indicates the phase difference between the transmit end and the receive end of the first network device, Tslot indicates sending time of each slot, NumberAll is a value of M in the M slots, and mod indicates a modulo operation.

In some embodiments, the determining unit 1702 is specifically configured to: determine whether the first reference slot is occupied; and if the first reference slot is not occupied, determine that the first reference slot is the second slot; or if the first reference slot is occupied, determine that a $1^{st}$ vacant slot after the first reference slot is the second slot.

In some embodiments, when a type of a service occupying the first slot is a preset type, the determining unit 1702 is specifically configured to: determine whether the first reference slot is occupied; if the first reference slot is not occupied, determine that the first reference slot is the second slot; or if the first reference slot is already occupied, determine whether a type of a conflicting service is the preset type, where the conflicting service is a service occupying the first reference slot; and if the type of the conflicting service is not the preset type, determine that the first reference slot is the second slot; or if the type of the conflicting service is the preset type, determine that a $1^{st}$ slot, after the first reference slot, that is not occupied by the preset type is the second slot.

In some embodiments, the determining unit 1702 is further configured to: when the first reference slot is already occupied by the conflicting service and the type of the conflicting service is not the preset type, determine that a $1^{st}$ available slot after the first reference slot is a slot for sending the conflicting service.

In some embodiments, the computer device is a network management apparatus for the first network device, or the computer device is the first network device. The network management apparatus may be the network management apparatus 100 shown in FIG. 1. The first network device may be the communication device 101, the intermediate node 110, the intermediate node 111, the intermediate node 112, or the second communication device 102 shown in FIG. 1.

In some embodiments, when the first slot is one of the N slots and the second slot is one of the M slots, the obtaining unit 1701 is specifically configured to receive a slot configuration request message, where the slot configuration request message includes an identifier of the service occupying the first slot and a slot number of the first slot.

In some embodiments, the obtaining unit 1701 is specifically configured to receive the slot configuration request message from a second network device, where the second network device is an upstream device of the first network device; the computer device further includes a sending unit, and the sending unit is configured to send an ACK message to the second network device, where the ACK message indicates that the target device successfully receives the slot configuration request message; and the obtaining unit 1701 is further configured to receive a configuration activation message from the second network device, where the configuration activation message indicates an activation condition for the second slot.

In some embodiments, the latency correction parameter is preset duration, and the determining unit 1702 is specifically configured to: determine a first reference moment based on the first slot; determine a second reference moment based on a $1^{st}$ available slot after the first reference moment; and determine the second slot based on the first reference moment, the second reference moment, and the preset duration.

In some embodiments, the determining unit 1702 is specifically configured to: determine whether a difference between the second reference moment and the first reference moment is greater than the preset duration; and if the difference between the second reference moment and the first reference moment is greater than the preset duration, determine that a $1^{st}$ vacant slot after the first reference moment is the second slot; or if the difference between the second reference moment and the first reference moment is not greater than the preset duration, determine whether a difference between a third reference moment and the first reference moment is greater than the preset threshold, and determine the second slot based on a determining result, where the third reference moment is a moment of a $1^{st}$ available slot after the second reference moment.

In some embodiments, the latency correction parameter is sending time of each slot, and the determining unit 1702 is specifically configured to: determine a difference between a third reference moment and a fourth reference moment, where the third reference moment is a moment at which the first network device receives data of a service occupying the first slot, and the fourth reference moment is a moment at which the first network device sends the data of the service occupying the first slot; and determine the second slot based on the difference between the fourth reference moment and the third reference moment, a slot number of the first slot, and the sending time of each slot.

Figure 18:
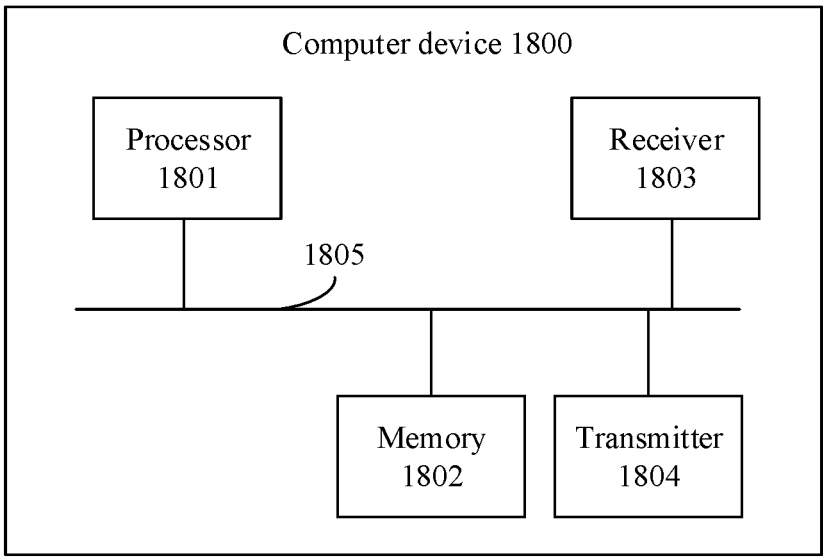
FIG. 18 is a block diagram of a structure of a computer device according to an embodiment of the present disclosure.

FIG. 18 is a block diagram of a structure of a computer device according to an embodiment of the present disclosure. The computer device 1800 shown in FIG. 18 may be the network management apparatus 100, the communication device 101, the intermediate node 110, the intermediate node 111, the intermediate node 112, or the second communication device 102 shown in FIG. 1. The computer device 1800 shown in FIG. 18 includes a processor 1801, a memory 1802, a receiver 1803, and a transmitter 1804.

The processor 1801, the memory 1802, the receiver 1803, and the transmitter 1804 may communicate with each other through a bus 1805.

The processor 1801 is a control center of the computer device 1800, and provides sequencing and processing facilities for executing instructions, executing interrupt actions, and providing a timing function and another function. Optionally, the processor 1801 includes one or more central processing units (CPUs). Optionally, the computer device 1800 includes a plurality of processors. The processor 1801 may be a single-core (single-CPU) processor or a multi-core (multi-CPU) processor. Alternatively, the processor 1801 may be an application-specific integrated circuit (ASIC), a system on chip (SoC), a network processor (NP), a digital signal processing circuit (DSP), a microcontroller (microcontroller unit, MCU), a programmable controller (programmable logic device, PLD), another programmable logic device, a discrete gate or transistor logic device, a discrete hardware component, another integrated chip, or the like.

Program code executed by the processor 1801 may be stored in the memory 1802. The processor 1801 controls communication with a peripheral device by controlling execution of another program or process, to control operation of the computer device 1800 and implement the operation steps of the foregoing methods.

The receiver 1803 is configured to receive a message from an adjacent node or a network management apparatus. The transmitter 1804 is configured to send information to the adjacent node or the network management apparatus.

In addition to a data bus, the bus 1805 may further include a power bus, a control bus, a status signal bus, and the like. However, for clarity of description, various buses are marked as the bus 1805 in the figure.

An embodiment of the present disclosure further provides a chip. The chip includes a logic circuit and an input/output interface. The logic circuit may be coupled to a memory, and is configured to execute instructions and/or code in the memory to implement the operation steps of the foregoing methods.

For example, the chip may be a field-programmable gate array (FPGA), an application-specific integrated circuit (ASIC), a system on chip (SoC), a CPU, a network processor (NP), a DSP, a MCU, a PLD, another programmable logic device, a discrete gate or transistor logic device, a discrete hardware component, or another integrated chip.

An embodiment of the present disclosure further provides a computer-readable storage medium. The computer-readable storage medium stores instructions. When the instructions are executed, the methods in the foregoing method embodiments are performed.

In a form of this embodiment, a computer program product including instructions is provided. When the instructions are executed, the methods in the foregoing method embodiments are performed.

A person of ordinary skill in the art may be aware that, in combination with examples described in embodiments disclosed in this specification, units and algorithm steps can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of the present disclosure.

It can be clearly understood by a person skilled in the art that, for ease and brevity of description, for a detailed operating process of the foregoing system, apparatus, and unit, reference may be made to a corresponding process in the foregoing method embodiments, and details are not described herein again.

In several embodiments provided in the present disclosure, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, that is, may be located in one place, or may be distributed on a plurality of network units. Some or all of the units may be selected according to actual requirements to achieve objectives of solutions of embodiments.

In addition, functional units in embodiments of the present disclosure may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of the present disclosure essentially, or a part contributing to the conventional technology, or some of technical solutions may be implemented in a form of a software product. The computer software product is stored in a storage medium, and includes several instructions for instructing a computer device (which may be a personal computer, a server, a computer device, or the like) to perform all or some of the steps of the methods described in embodiments of the present disclosure. The storage medium includes any medium that can store program code, for example, a universal serial bus (USB) flash drive, a removable hard disk, a read-only memory (ROM), a random-access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, implemented by a target device, for determining a transmission time slot or a reception time slot, the method comprising:

obtaining a first time slot from N time slots of a receive PHY device of a first network device or from M time slots of a send PHY device of the first network device;

determining, based on a latency correction parameter and the first time slot, a second time slot from the N time slots or from the M time slots;

determining that the second time slot is from either the M time slots or the N time slots based on whether the first time slot is from the N time slots or the M time slots;

determining that the second time slot is from the M time slots when the first time slot is obtained from the N time slots; and determining that the second time slot is from the N time slots when the first time slot is from the M time slots, wherein M and N are positive integers greater than or equal to 1.

2. The method of claim 1, wherein the N time slots are part of one or more P coarse granularity time slots of the receive PHY device, and wherein the M time slots are part of one or more of Q coarse granularity time slots of the send PHY device.

3. The method of claim 1, wherein the latency correction parameter comprises any one or more of a phase difference between a transmit end and a receive end of the first network device or an internal latency of the first network device.

4. The method of claim 3, wherein determining the second time slot based on the latency correction parameter and the first time slot comprises:

determining a first reference time slot based on the first time slot and the latency correction parameter; and determining the second time slot based on the first reference time slot.

5. The method of claim 4, wherein when the first time slot is one of the N time slots and the second time slot is one of the M time slots, determining the first reference time slot based on the first time slot and the latency correction parameter comprises:

determining a third time slot based on the first time slot, wherein the first time slot and the third time slot correspond to a same moment, and wherein the third time slot is a time slot comprised in the send PHY device; and determining the first reference time slot based on the following formula:

$$SlotNumOut = \left(SlotNumberIn + (|Tp| + ||Ts|)/Tslot\right) \bmod NumberAll,$$

wherein SlotNumOut indicates the first reference time slot, wherein SlotNumberIn indicates a time slot number of the third time slot, wherein Tp indicates the internal latency of the first network device, wherein Ts indicates the phase difference between the transmit end and the receive end of the first network device, wherein Tslot indicates sending time of each time slot, wherein NumberAll is a value of M in the M time slots, and wherein mod indicates a modulo operation.

6. The method of claim 4, wherein when the first time slot is one of the M time slots and the second time slot is one of the N time slots, determining the first reference time slot based on the first time slot and the latency correction parameter comprises:

determining a fourth time slot based on the first time slot, wherein the first time slot and the fourth time slot correspond to a same moment, and the fourth time slot is a time slot comprised in the receive PHY device; and determining the first reference time slot based on the following formula:

$$SlotNumOut = \left(SlotNumberIn + (|Tp| + ||Ts|)/Tslot\right) \bmod NumberAll,$$

wherein SlotNumOut indicates the first reference time slot, wherein SlotNumberIn indicates a time slot number of the fourth time slot, wherein Tp indicates the internal latency of the first network device, wherein Ts indicates the phase difference between the transmit end and the receive end of the first network device, wherein Tslot indicates sending time of each time slot, wherein NumberAll is a value of M in the M time slots, and wherein mod indicates a modulo operation.

7. The method of claim 4, wherein determining the second time slot based on the first reference time slot comprises:

determining whether the first reference time slot is occupied; and determining, when the first reference time slot is not occupied, that the first reference time slot is the second time slot; or determining, when the first reference time slot is occupied, that a first vacant time slot after the first reference time slot is the second time slot.

8. The method of claim 4, wherein when a first type of a service occupying the first time slot is a preset type, determining the second time slot based on the first reference time slot comprises:

determining whether the first reference time slot is occupied;

determining, when the first reference time slot is not occupied, that the first reference time slot is the second time slot; or determining, when the first reference time slot is occupied, whether a second type of a conflicting service is the preset type, wherein the conflicting service is the service occupying the first reference time slot; and determining, when the second type of the conflicting service is not the preset type, that the first reference time slot is the second time slot; or determining, when the second type of the conflicting service is the preset type, that a first time slot, after the first reference time slot, that is not occupied by the preset type is the second time slot.

9. The method of claim 8, further comprising when the first reference time slot is occupied by the conflicting service and the second type of the conflicting service is not the preset type, determining that a first available time slot after the first reference time slot is for sending the conflicting service.

10. The method of claim 1, wherein the target device is a network management apparatus for the first network device, or wherein the target device is the first network device.

11. The method of claim 10, wherein when the first time slot is one of the N time slots and the second time slot is one of the M time slots, obtaining the first time slot comprises receiving a time slot configuration request message comprising an identifier of a service occupying the first time slot and a time slot number of the first time slot.

12. The method of claim 11, wherein receiving the time slot configuration request message comprises receiving the time slot configuration request message from a second network device upstream of the first network device, and wherein prior to determining the second time slot based on a latency correction parameter and the first time slot, the method further comprises:

sending, to the second network device, an acknowledgement (ACK) message indicating that the target device successfully received the time slot configuration request message; and receiving, from the second network device, a configuration activation message indicating an activation condition for the second time slot.

13. The method of claim 1, wherein the latency correction parameter is a preset duration, and wherein determining the second time slot based on the latency correction parameter and the first time slot comprises:

determining a first reference moment based on the first time slot;

determining a second reference moment based on a first available time slot after the first reference moment; and determining the second time slot based on the first reference moment, the second reference moment, and the preset duration.

14. The method of claim 13, wherein determining the second time slot based on the first reference moment, the second reference moment, and the preset duration comprises:

determining whether a first difference between the second reference moment and the first reference moment is greater than the preset duration; and determining, when the first difference is greater than the preset duration, that a first vacant time slot after the first reference moment is the second time slot; or determining, when the first difference is not greater than the preset duration, the second time slot based on whether a second difference between a third reference moment and the first reference moment is greater than a preset threshold, wherein the third reference moment is a moment of a 1st available time slot after the second reference moment.

15. The method of claim 1, wherein the latency correction parameter is a sending time of each time slot, and wherein determining the second time slot based on the latency correction parameter and the first time slot comprises:

determining a difference between a third reference moment and a fourth reference moment, wherein the third reference moment is when the first network device receives data of a service occupying the first time slot, and wherein the fourth reference moment is when the first network device sends the data of the service occupying the first time slot; and determining the second time slot based on the difference, a time slot number of the first time slot, and the sending time of each time slot.

16. A computer device comprising:

one or more processors; and a non-transitory computer-readable memory configured to store a program to be executed by the one or more processors, wherein the program includes instructions that, when executed by the one or more processors, cause the computer device to:

obtain a first time slot from N time slots of a receive PHY device of a first network device or from M time slots of a send PHY device of the first network device;

determine, based on a latency correction parameter and the first time slot, a second time slot from the N time slots or from the M time slots;

determine that the second time slot is from either the M time slots or the N time slots based on whether the first time slot is from the N time slots or the M time slots;

determine that the second time slot is from the M time slots when the first time slot is obtained from the N time slots; and determine that the second time slot is from the N time slots when the first time slot is from the M time slots, wherein M and N are positive integers greater than or equal to 1.

17. The computer device of claim 16, wherein the N time slots are part of one or more P coarse granularity time slots of the receive PHY device, and wherein the M time slots are part of one or more of Q coarse granularity time slots of the send PHY device.

18. The computer device of claim 16, wherein the latency correction parameter comprises any one or more of a phase difference between a transmit end and a receive end of the first network device or an internal latency of the first network device.

19. The computer device of claim 18, wherein the program when executed by the one or more processors further cause the computer device to:

determine a first reference time slot based on the first time slot and the latency correction parameter; and determine the second time slot based on the first reference time slot.

20. A computer program product comprising computer-executable instructions stored on a non-transitory computer-readable storage medium, the computer-executable instructions when executed by one or more processors of an apparatus, cause the apparatus to:

obtain a first time slot from N time slots of a receive PHY device of a first network device or from M time slots of a send PHY device of the first network device;

determine, based on a latency correction parameter and the first time slot, a second time slot from the N time slots or from the M time slots;

determine that the second time slot is from either the M time slots or the N time slots based on whether the first time slot is from the N time slots or the M time slots;

determine that the second time slot is from the M time slots when the first time slot is obtained from the N time slots; and determine that the second time slot is from the N time slots when the first time slot is from the M time slots, wherein M and N are positive integers greater than or equal to 1.

* * * * *